(12) United States Patent
Vazquez et al.

(10) Patent No.: US 12,208,899 B2
(45) Date of Patent: Jan. 28, 2025

(54) DISPLAY SYSTEMS WITH A MODULAR PERIPHERAL BAR ASSEMBLY AND ASSOCIATED METHODS THEREOF

(71) Applicant: Panasonic Avionics Corporation, Irvine, CA (US)

(72) Inventors: Steven Christopher Vazquez, Chino, CA (US); David Diaz, Rancho Santa Margarita, CA (US); Yoshimi Yamamoto, Rancho Santa Margarita, CA (US); Kiyoshi Yokota, Hirakata (JP); Ogura Motonari, Osaka (JP)

(73) Assignee: Panasonic Avionics Corporation, Irvine, CA (US)

( * ) Notice: Subject to any disclaimer, the term of this patent is extended or adjusted under 35 U.S.C. 154(b) by 406 days.

(21) Appl. No.: 17/742,692

(22) Filed: May 12, 2022

(65) Prior Publication Data
US 2023/0365259 A1 Nov. 16, 2023

(51) Int. Cl.
*B64D 11/00* (2006.01)
*B60R 11/02* (2006.01)
(Continued)

(52) U.S. Cl.
CPC .... *B64D 11/00151* (2014.12); *B60R 11/0235* (2013.01); *B64D 11/0015* (2013.01); *H04N 23/57* (2023.01); *B60R 2011/0015* (2013.01); *B60R 2011/0073* (2013.01); *B60R 2011/0075* (2013.01)

(58) Field of Classification Search
CPC .......... B64D 11/00151; B64D 11/0015; B64D 11/00152; B60R 11/0235; B60R 2011/0015; B60R 2011/0073; B60R 2011/0075; B60R 11/04; H04N 23/57
See application file for complete search history.

(56) References Cited

U.S. PATENT DOCUMENTS

| | | | |
|---|---|---|---|
| 5,788,532 A | 8/1998 | Takiguchi et al. | |
| 7,095,457 B2 | 8/2006 | Chou | |

(Continued)

FOREIGN PATENT DOCUMENTS

| | | |
|---|---|---|
| FR | 3016563 A1 | 7/2015 |
| JP | 2004031155 A | 1/2004 |

OTHER PUBLICATIONS

Non-Final Office Action on co-pending (U.S. Appl. No. 18/109,665) dated Dec. 22, 2023.

(Continued)

*Primary Examiner* — Donald L Raleigh
(74) *Attorney, Agent, or Firm* — LOZA & LOZA, LLP

(57) ABSTRACT

Innovative peripheral bar assembly for a transportation vehicle is provided. The assembly includes a front bar housing with a front segment and a rear segment; a rear bar housing with a front segment coupled to the rear segment of the front bar housing; and an input/output (I/O) printed circuit board ("PCB") having an I/O connector. The I/O PCB coupled to the rear segment of the front bar housing. The assembly is coupled to a chassis of a display system having a display module, and the I/O connector is coupled to a connector of the display module for enabling an electrical connection between the peripheral bar assembly and the display module.

20 Claims, 42 Drawing Sheets

(51) Int. Cl.
*H04N 23/57* (2023.01)
*B60R 11/00* (2006.01)

(56) References Cited

U.S. PATENT DOCUMENTS

| | | | |
|---|---|---|---|
| D558,738 S | 1/2008 | Andre et al. | |
| D592,187 S | 5/2009 | Ledbetter et al. | |
| 8,057,062 B2 | 11/2011 | Yu et al. | |
| D660,794 S | 5/2012 | Fahrendorff et al. | |
| D662,491 S | 6/2012 | Andre et al. | |
| D669,873 S | 10/2012 | Margis et al. | |
| D669,874 S | 10/2012 | Margis et al. | |
| 8,366,306 B2 | 2/2013 | Hsieh et al. | |
| D677,639 S | 3/2013 | Margis et al. | |
| D688,060 S | 8/2013 | Sizelove | |
| D702,070 S | 4/2014 | Sizelove | |
| D749,052 S | 2/2016 | Margis et al. | |
| D753,077 S | 4/2016 | Margis et al. | |
| D773,423 S | 12/2016 | Margis et al. | |
| 9,832,512 B2 | 11/2017 | Riedel | |
| D812,026 S | 3/2018 | Margis et al. | |
| 9,945,509 B2* | 4/2018 | Barnes | F16M 11/041 |
| D819,582 S | 6/2018 | Izadyar et al. | |
| D829,110 S | 9/2018 | Skurdal | |
| D844,619 S | 4/2019 | Wendling et al. | |
| D849,008 S | 5/2019 | Wendling et al. | |
| D850,396 S | 6/2019 | Izadyar et al. | |
| D869,393 S | 12/2019 | Urasini et al. | |
| D904,328 S | 12/2020 | Margis et al. | |
| D908,861 S | 1/2021 | Appiahene-Agyei et al. | |
| D922,388 S | 6/2021 | Liu | |
| D922,389 S | 6/2021 | Liu | |
| 11,029,548 B2 | 6/2021 | Diaz et al. | |
| D924,236 S | 7/2021 | Izadyar et al. | |
| 11,607,957 B1 | 3/2023 | Diaz et al. | |
| 2007/0297064 A1 | 12/2007 | Watanabe et al. | |
| 2010/0134964 A1* | 6/2010 | Smith | H04M 1/04 361/679.02 |
| 2011/0096545 A1 | 4/2011 | Chang | |
| 2011/0174926 A1 | 7/2011 | Margis et al. | |
| 2011/0273873 A1 | 11/2011 | Suzuki et al. | |
| 2011/0305036 A1 | 12/2011 | Tsai et al. | |
| 2012/0039048 A1 | 2/2012 | Mondragon et al. | |
| 2012/0075881 A1 | 3/2012 | Hsieh et al. | |
| 2015/0257224 A1 | 9/2015 | Timm et al. | |
| 2016/0249073 A1 | 8/2016 | Margis et al. | |
| 2018/0267637 A1 | 9/2018 | Wild et al. | |
| 2019/0105988 A1 | 4/2019 | Mishra et al. | |
| 2019/0353343 A1 | 11/2019 | Pan | |
| 2020/0014881 A1 | 1/2020 | Hailey et al. | |
| 2020/0107419 A1 | 4/2020 | Lee | |
| 2020/0296847 A1 | 9/2020 | Giammaria et al. | |
| 2021/0170871 A1* | 6/2021 | Di Censo | B60R 11/0235 |
| 2021/0276715 A1 | 9/2021 | Shetgar et al. | |
| 2022/0308384 A1 | 9/2022 | Shen et al. | |
| 2023/0145345 A1 | 5/2023 | Hurtado | |

OTHER PUBLICATIONS

Notice of Allowance on co-pending (U.S. Appl. No. 17/940,875) dated Feb. 14, 2024.
European Search Report, European Patent Application No. 23169760.8, Oct. 12, 2023, 7 pgs.
Notice of Allowance on co-pending (U.S. Appl. No. 17/742,681) mailed Dec. 15, 2022.
Final Office Action on co-pending (U.S. Appl. No. 18/109,665) dated Jul. 3, 2024.
Notice of Allowance on co-pending US application (U.S. Appl. No. 18/109,665) dated Sep. 17, 2024.
Notice of Allowance on co-pending U.S. Appl. No. 29/838,351 dated Oct. 23, 2024.

* cited by examiner

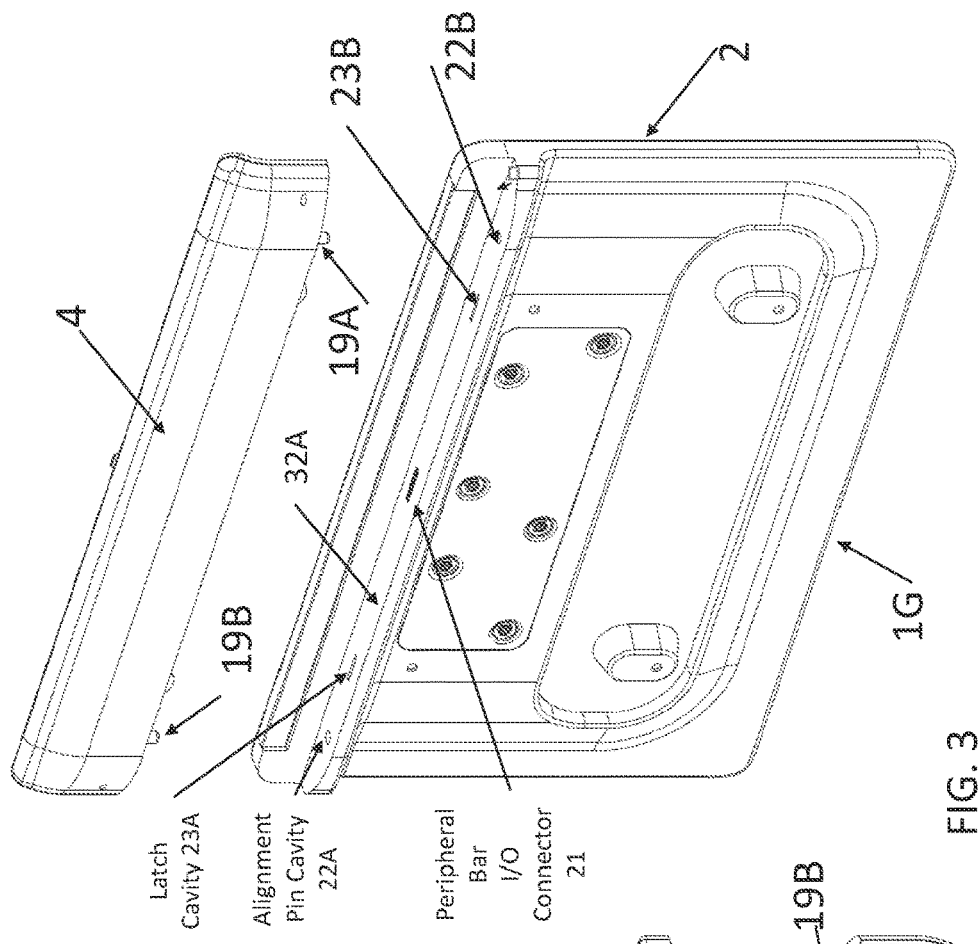
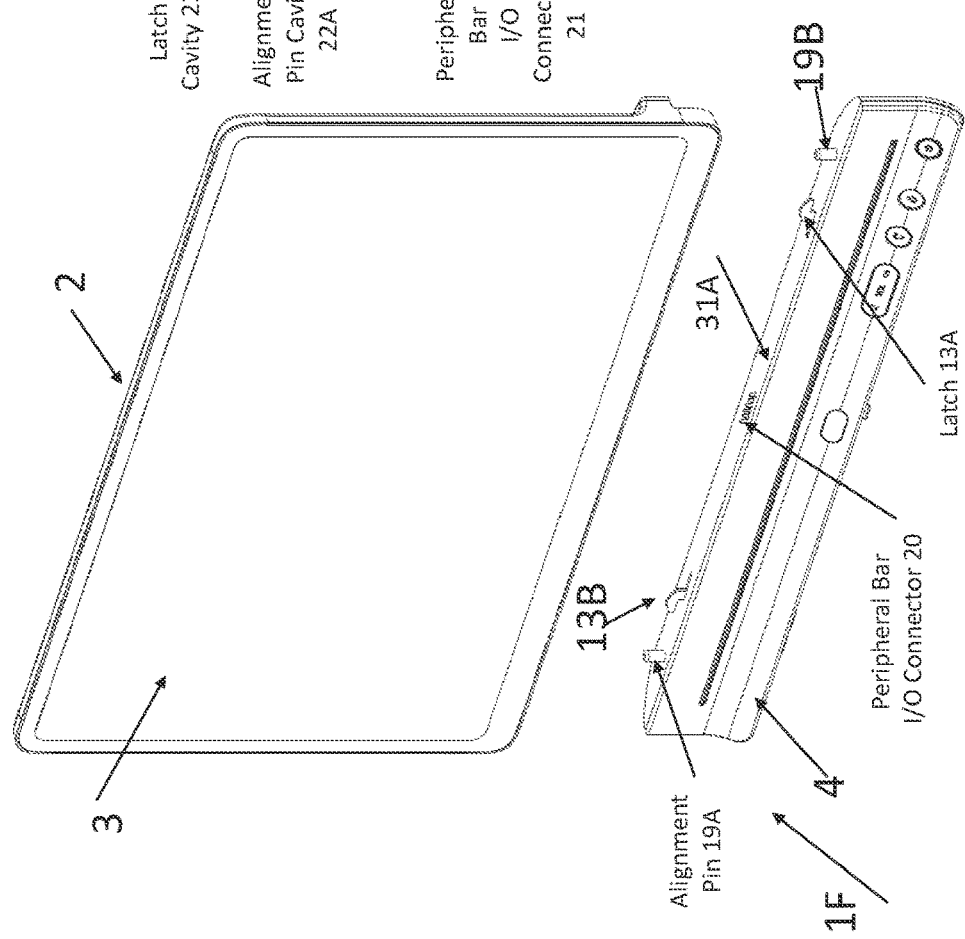
FIG. 3

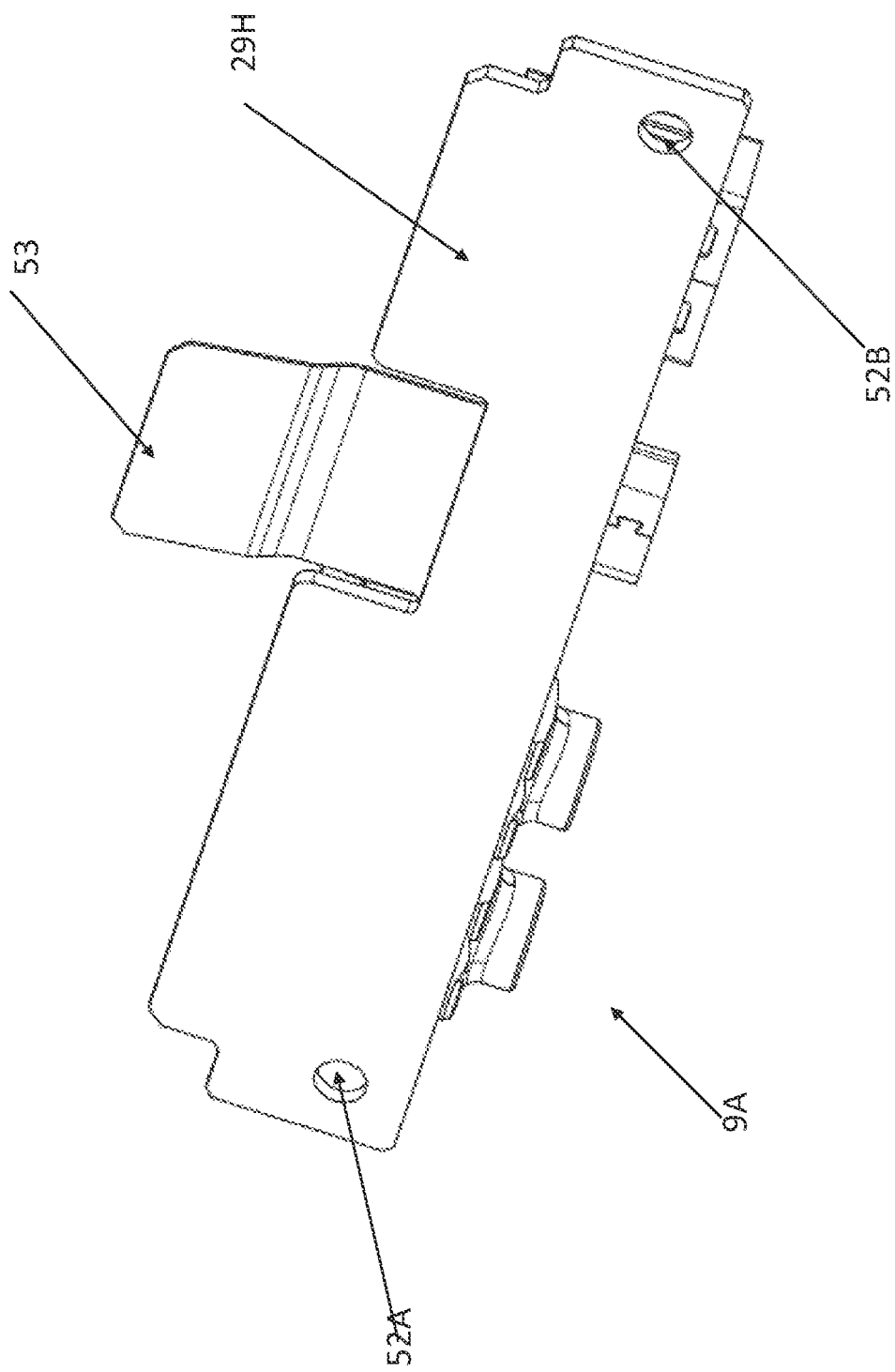

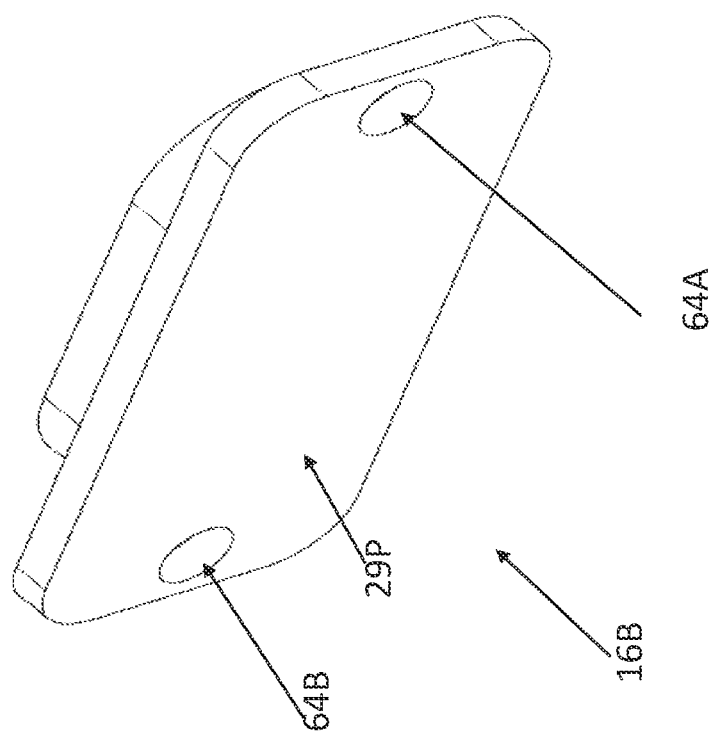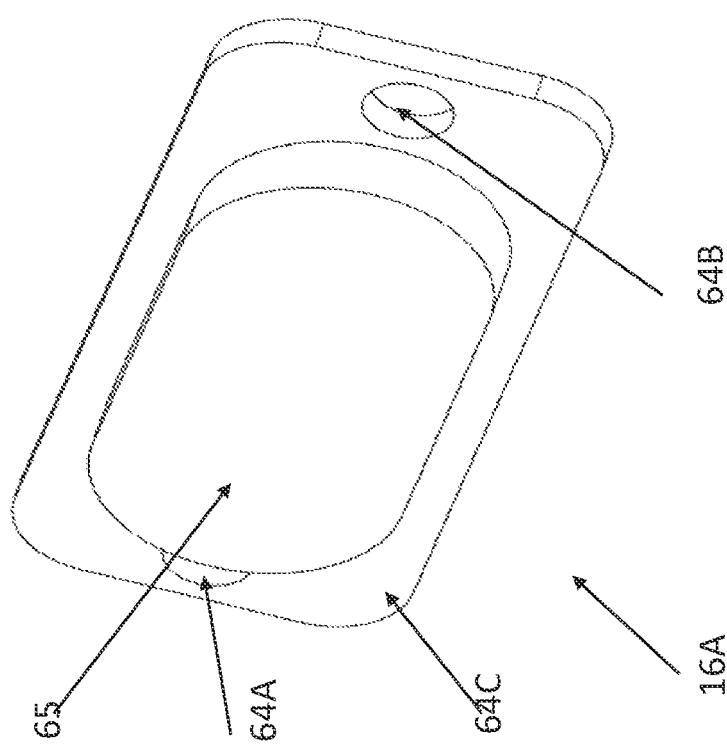
FIG. 12

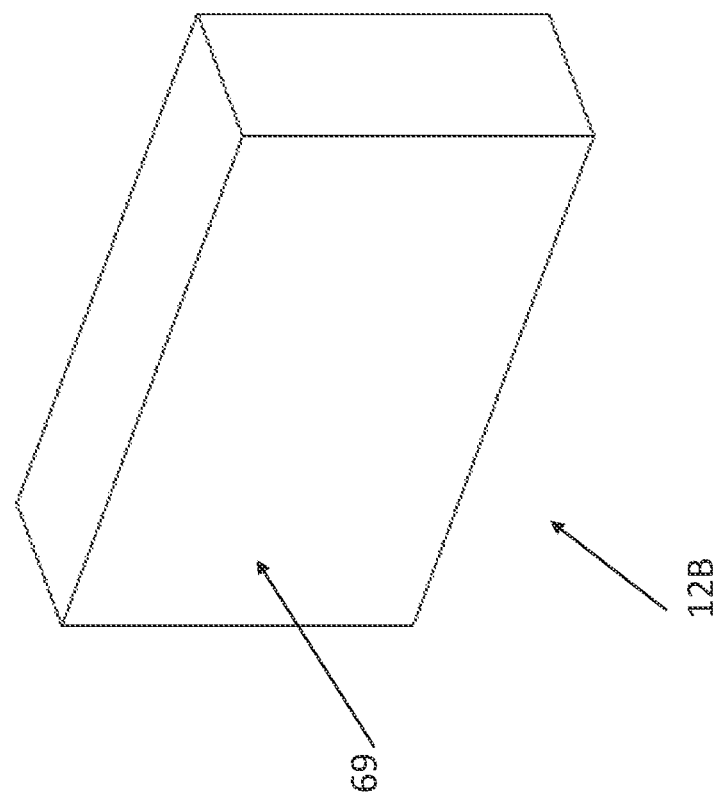
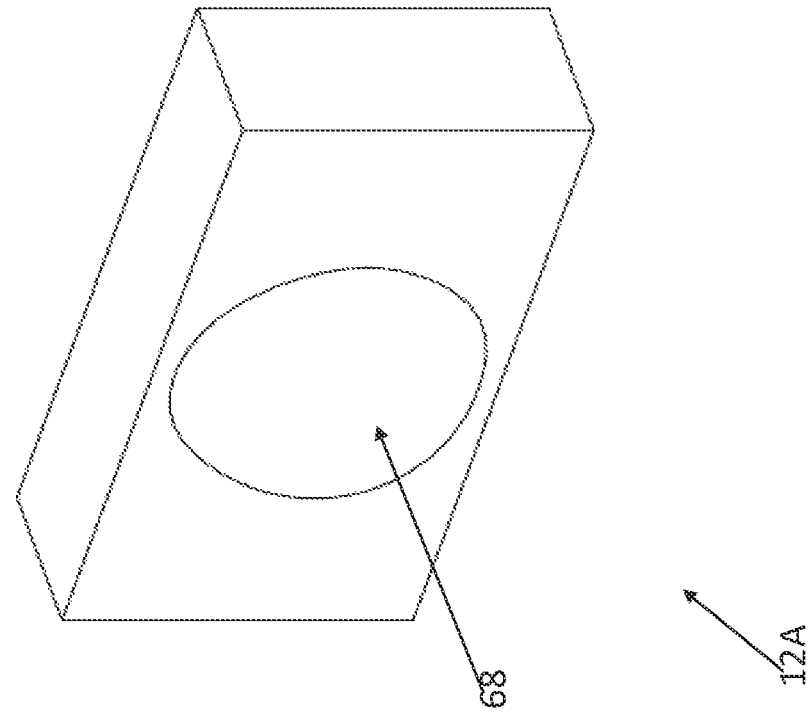
FIG. 14A

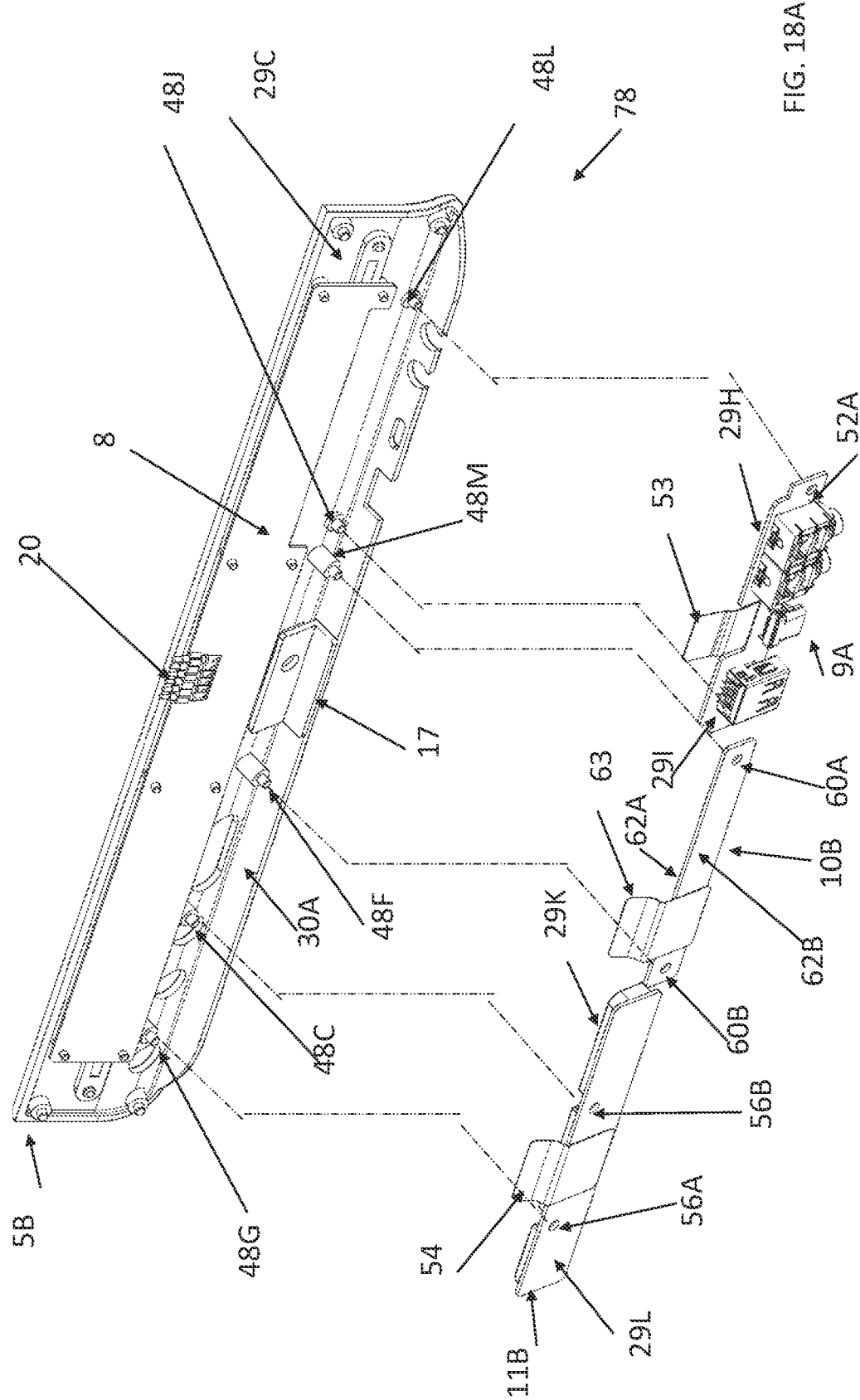

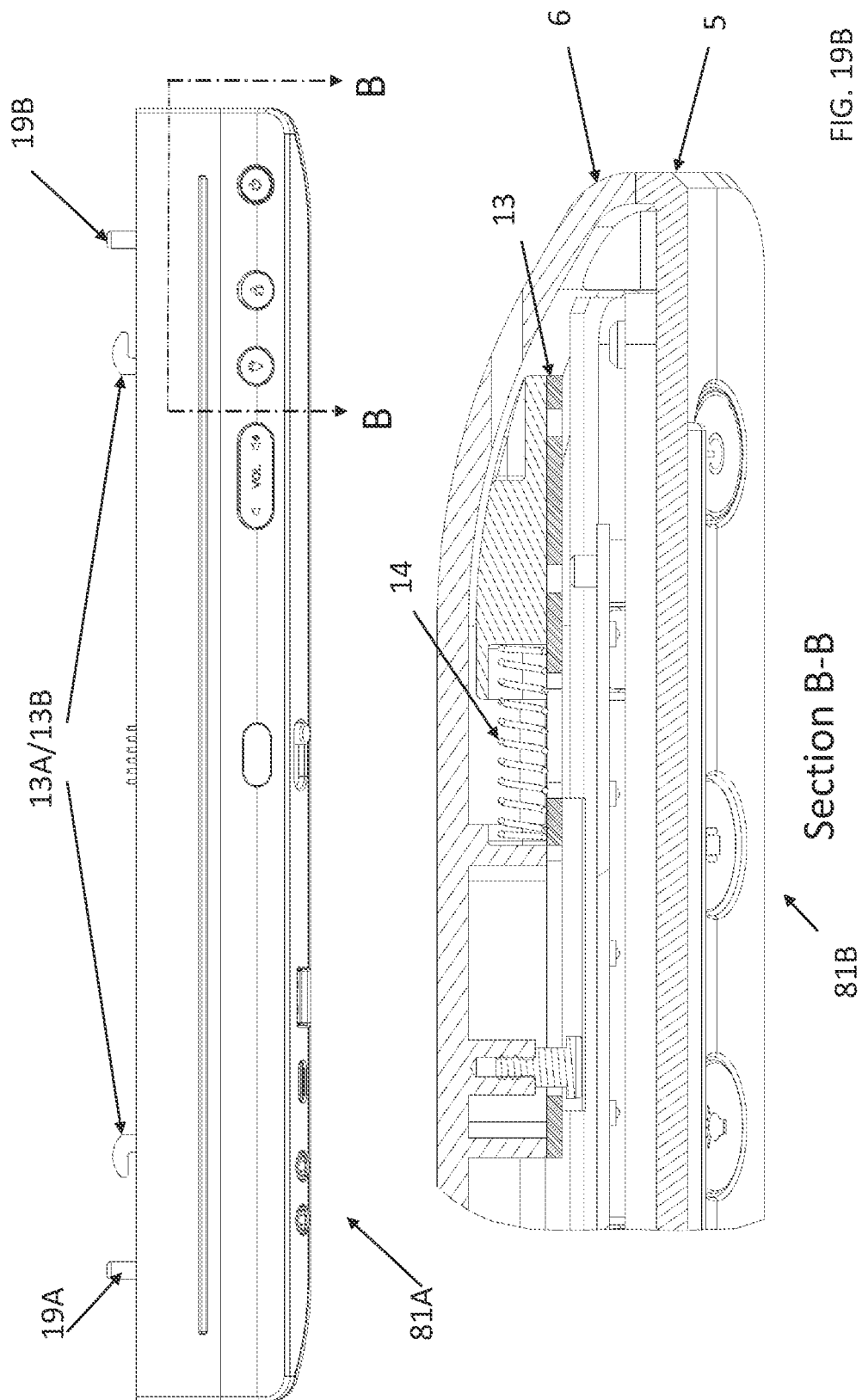

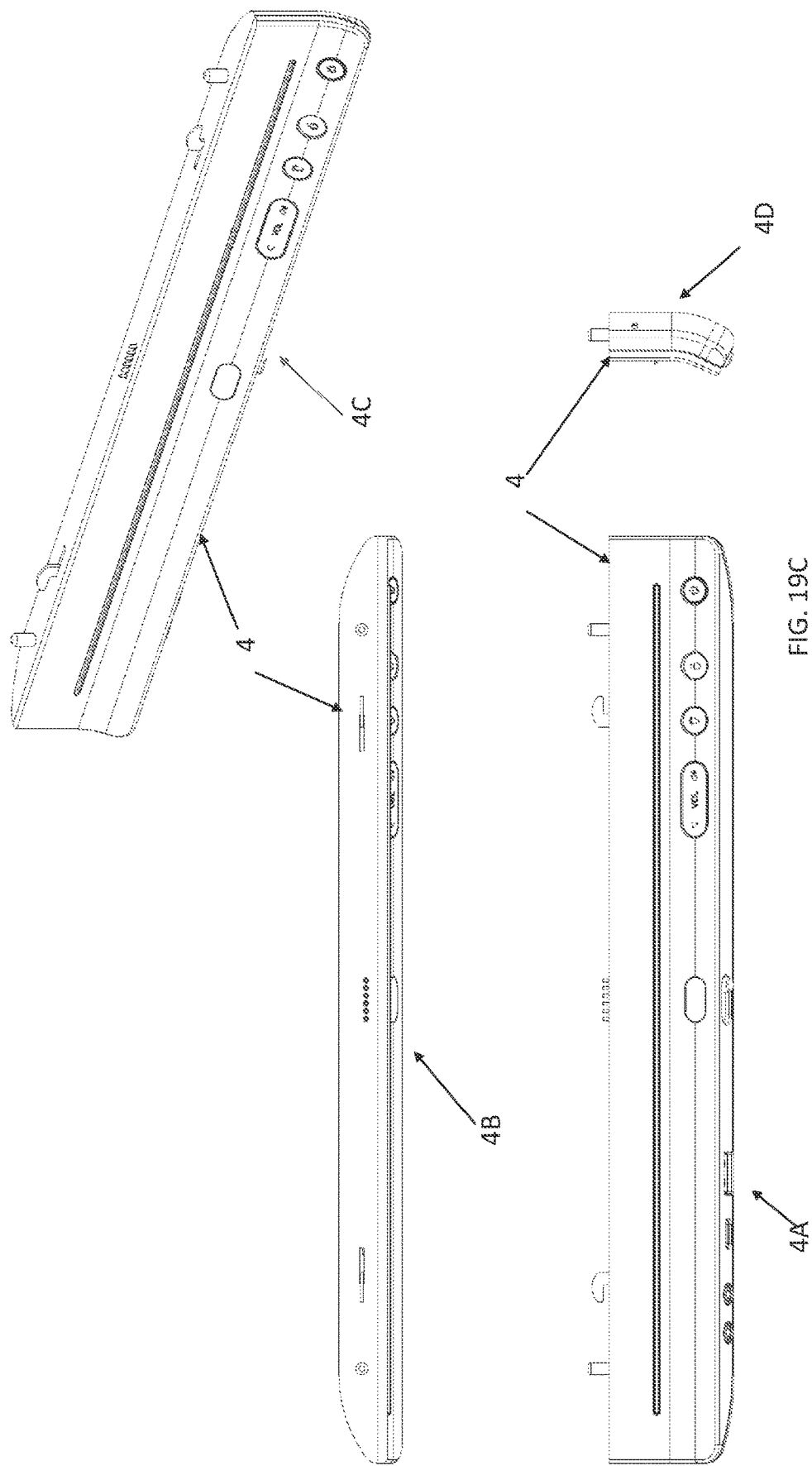

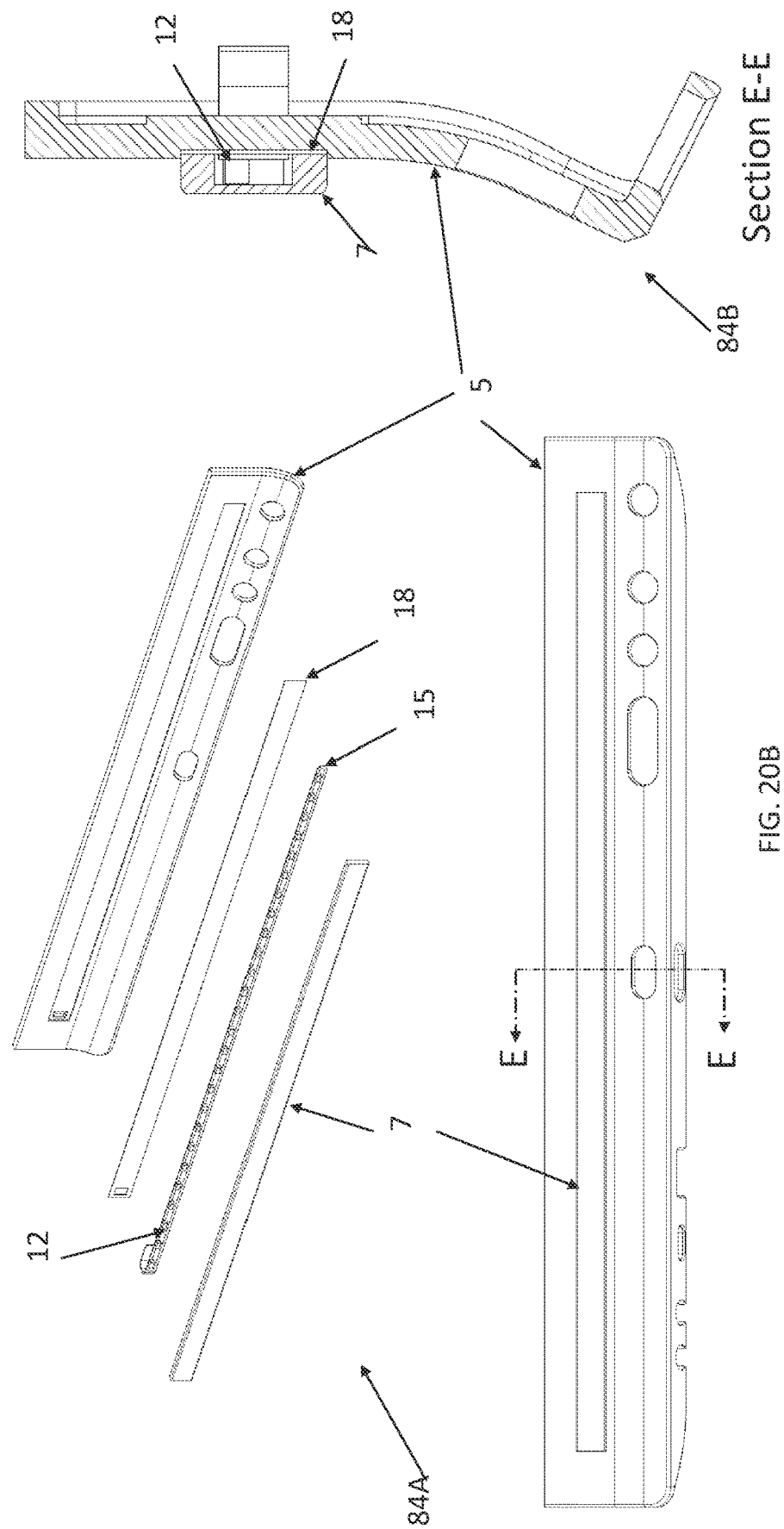

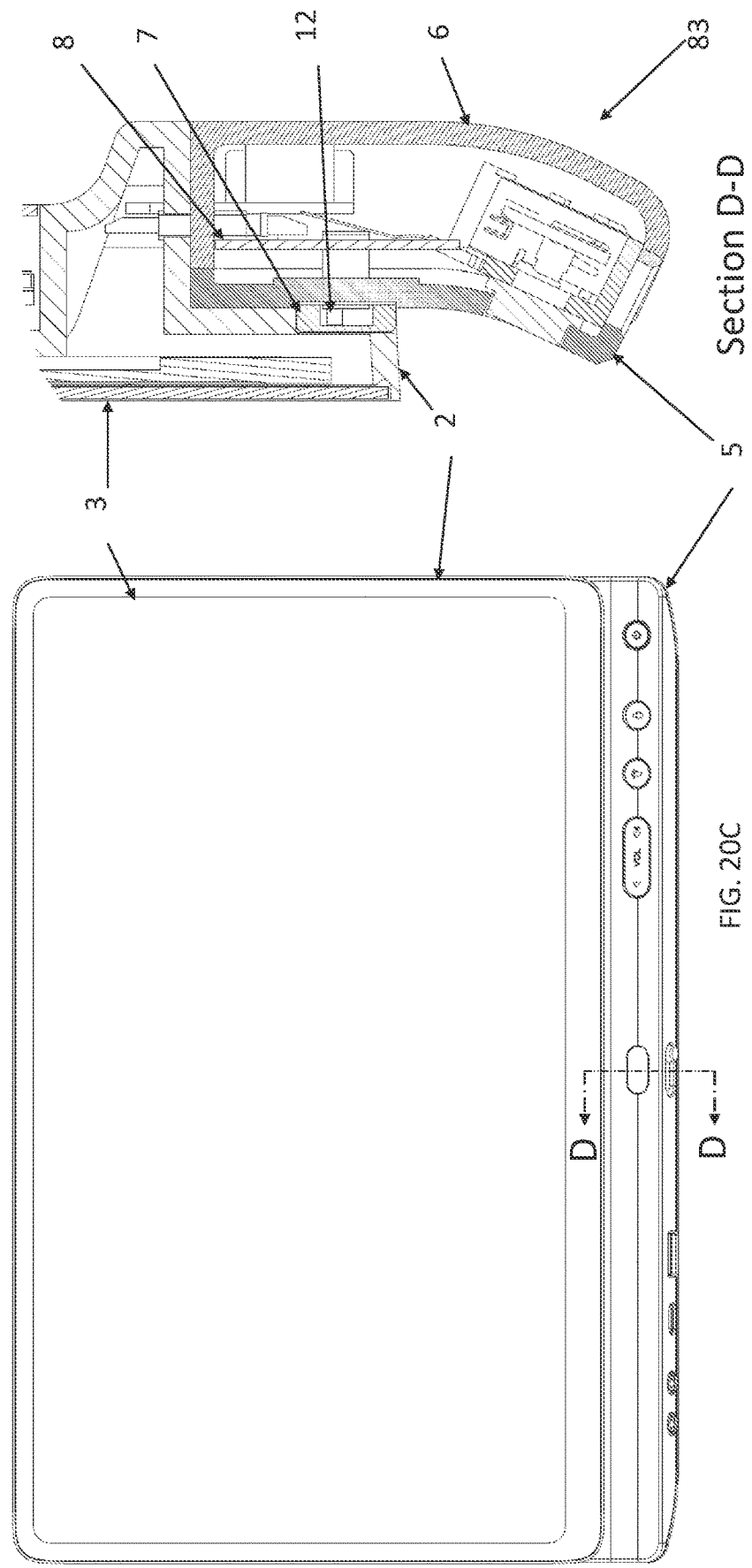

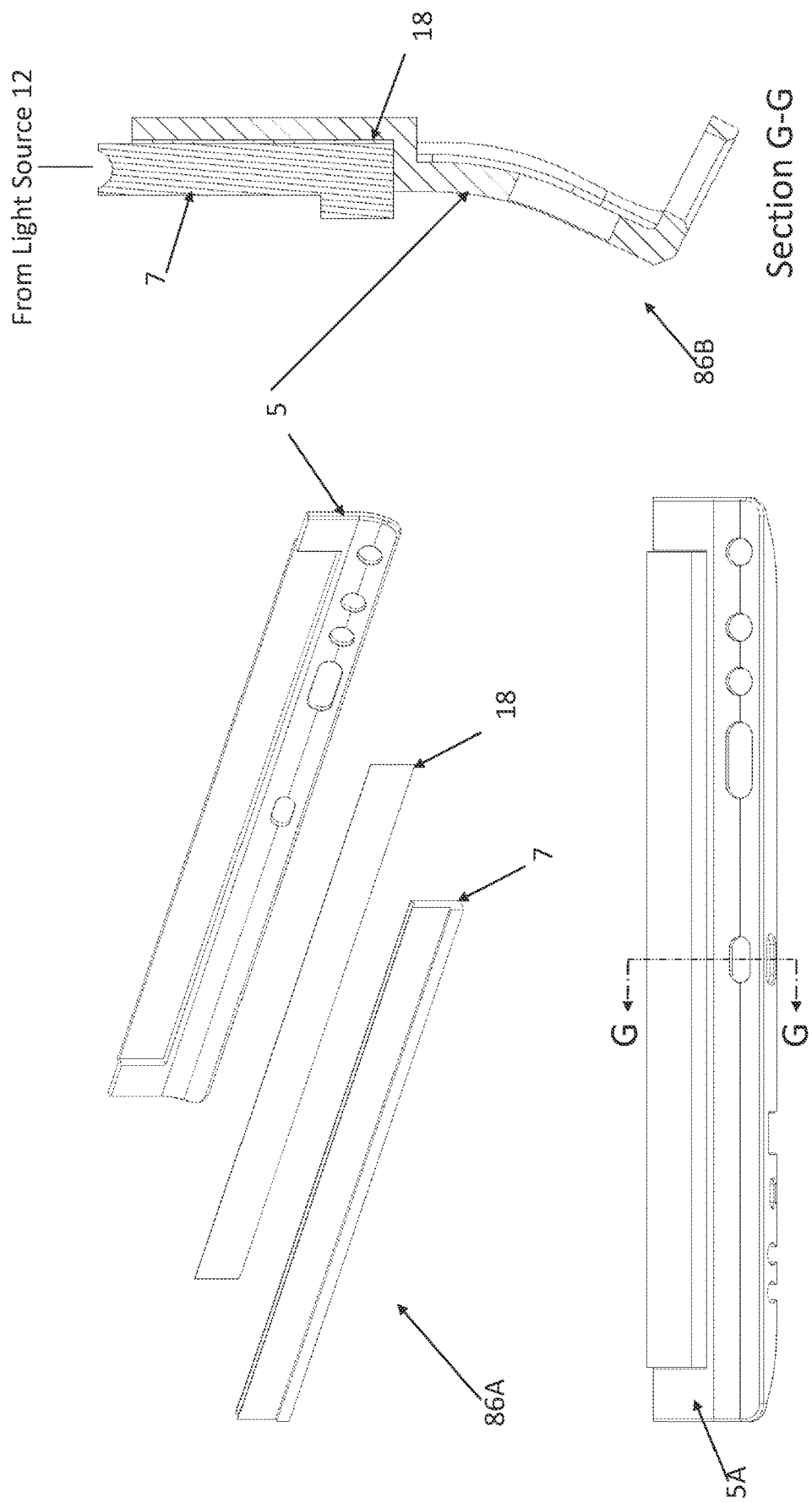

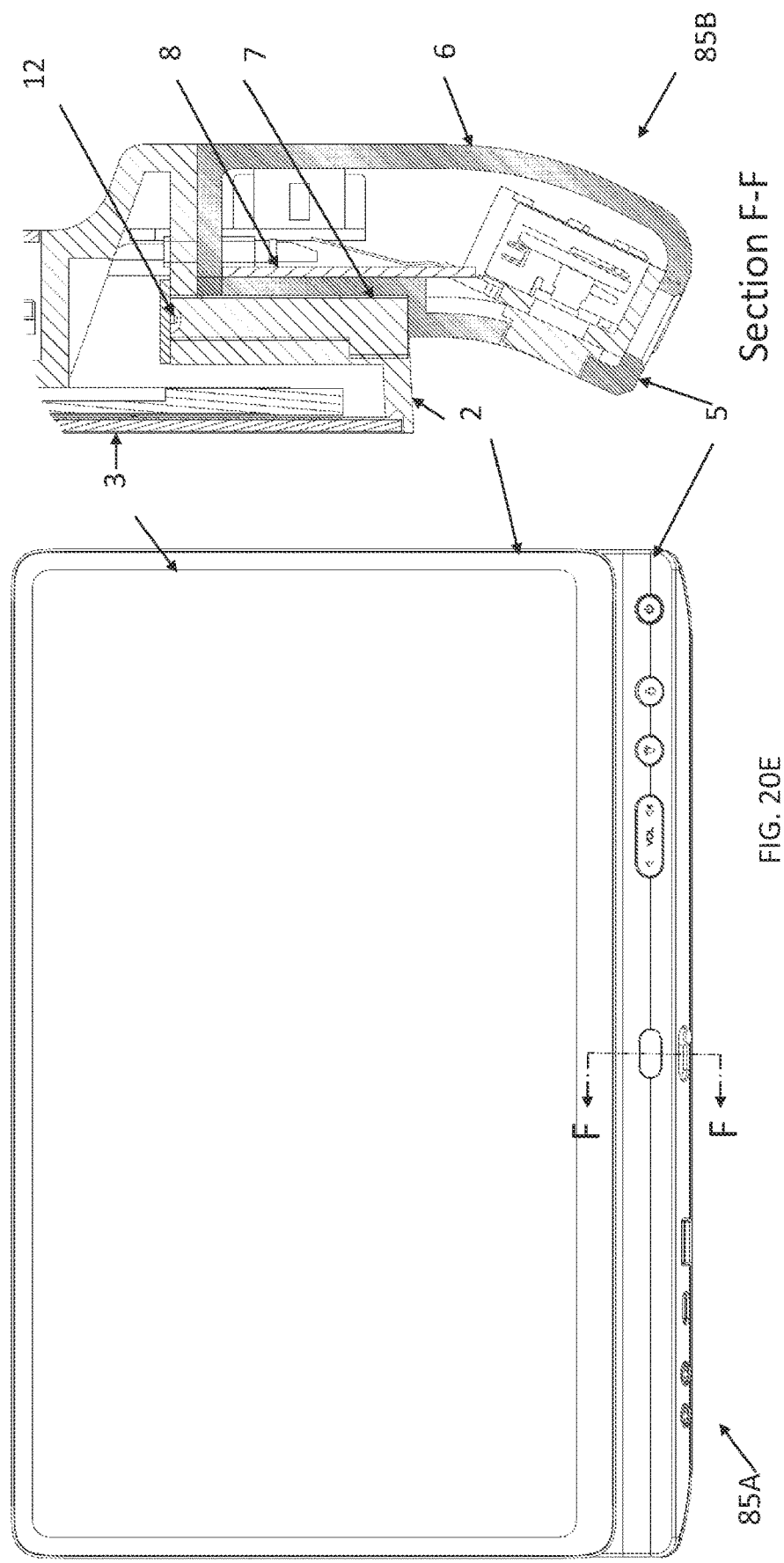

DISPLAY SYSTEMS WITH A MODULAR PERIPHERAL BAR ASSEMBLY AND ASSOCIATED METHODS THEREOF

TECHNICAL FIELD

The present disclosure relates to display systems installed in a vehicle, and more particularly, to a configurable, peripheral bar assembly that is operationally coupled to a chassis/display module of a display system on a vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems or "in-flight entertainment and communication" ("IFEC") systems, jointly referred to herein as IFE systems. An IFE system can also be referred to as a display system, a video display system, a video monitor, or a smart monitor.

It is common to have the IFE display systems affixed to a support structure on an aircraft. The display system typically has a chassis with a display screen or module. Conventional display systems do not have accent lighting that can be customized by a user. Most of the lighting from the display system are limited and difficult to customize. Another short coming of conventional display systems is that various interfaces, including universal serial bus (USB) jacks, Bluetooth printed circuit board ("PCB"), camera PCBs, input/output ("I/O") PCBs are fully integrated and structurally embedded in the display system. This integrated approach has limitations because it is not easy to customize available hardware/software features for the video display system. Continuous efforts are being made to develop display system technology that enables accent lighting option. Furthermore, continuous efforts are being made to develop modular peripheral accessories for customizable display systems that can be deployed on aircrafts and other transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 3 shows an exploded view of attaching the peripheral housing assembly of the display system of to a display module/chassis, according to one aspect of the present disclosure;

FIG. 8A shows a front isometric view of an IJU PCB of the peripheral bar assembly, according to one aspect of the present disclosure.

FIG. 12 shows a front isometric and a rear isometric view of a camera lens, used according to one aspect of the present disclosure.

FIG. 14A shows a front isometric and a rear isometric view of a light source, used according to one aspect of the present disclosure.

FIG. 18A shows an exploded view of attaching a plurality of PCBs to the front bar housing, according to one aspect of the present disclosure.

FIG. 19B shows the peripheral bar housing assembly with a sectional view, according to one aspect of the present disclosure.

FIG. 19B shows the peripheral bar housing assembly with a sectional view, according to one aspect of the present disclosure.

FIG. 19C shows a front view, a top view and a front isometric view of the peripheral bar housing, according to one aspect of the present disclosure.

FIG. 20B shows an exploded view for placing a light source between the peripheral bar assembly and the main chassis of the display system, according to one aspect of the present disclosure.

FIG. 20C shows a front view and a sectional view of the display system with the light source placed between the peripheral bar assembly and the main chassis of the display system, according to one aspect of the present disclosure.

FIG. 20D shows an exploded view for placing a light source in the main chassis of the display system, according to one aspect of the present disclosure.

FIG. 20E shows a front view and a sectional view of the display system with the light source in the main chassis of the display system, according to one aspect of the present disclosure.

DETAILED DESCRIPTION

The detailed description set forth below in connection with the appended drawings is intended as a description of systems and methods for a display system in accordance with the various aspects of the present disclosure and is not intended to represent the only forms in which the present disclosure may be constructed or utilized. The description sets forth the features and the steps for constructing and using the systems and methods associated with the display system. It is to be understood, however, that the same or equivalent functions and structures may be accomplished by different aspects that are also intended to be encompassed within the spirit and scope of the present disclosure defined by the appended claims.

Figure 1:
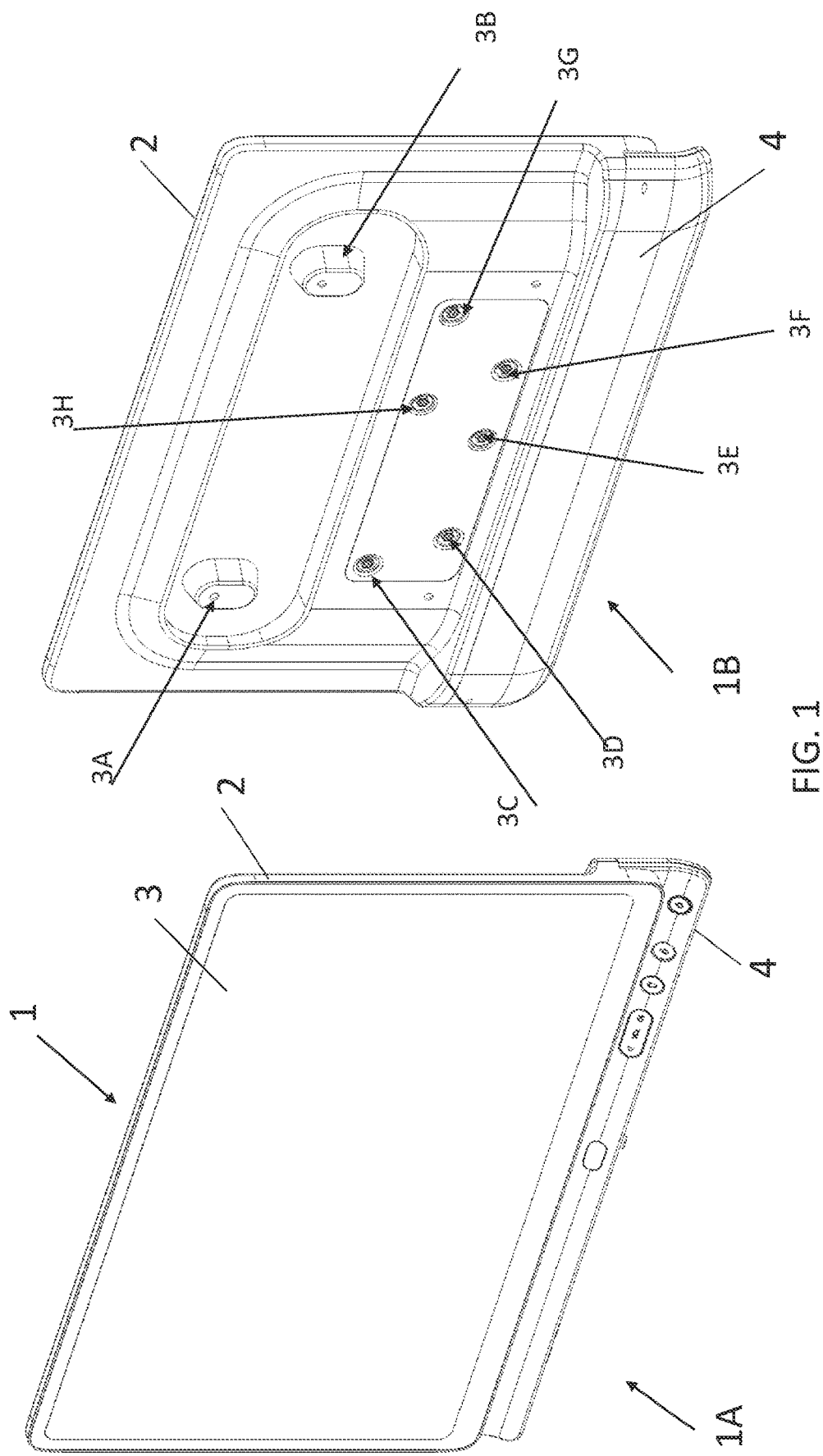
FIG. 1 shows a front and rear isometric view of a seat back display system installed with a modular peripheral housing assembly, according to one aspect of the present disclosure.

FIG. 1 shows a front isometric and a rear isometric view of a display system 1 (can also be referred to as video monitor assembly 1 or simply as system 1) with a main chassis (also referred to as chassis) 2, a display module 3 and a customizable, modular, peripheral bar assembly 4. The peripheral bar assembly 4 can be connected and disconnected from the main chassis 2, as described below in detail. The chassis 2 is a solid structure that houses the display module 3 that can be used by a user for computing needs and media entertainment, as described below.

In one aspect, the peripheral bar assembly 4 can be configured based on user needs and is operationally coupled with the main chassis using a latching mechanism, fasteners or by any other technique, as disclosed herein. Unlike conventional display system, where the various interfaces are fully integrated with a display system, the modular design and construction of the peripheral assembly 4 enables users to provide different configurations of the display system 1 without major re-design and qualification efforts. The term qualification as used herein means the process by which an entity, e.g., an airline, aircraft OEM or regulatory agency approves the placement of the display system on the aircraft.

As an example, the rear view of chassis 2 shows protruded elements 3A and 3B, and openings 3C-3G that are used to secure the chassis 2/display module 3 to a seat back or any other structure on a transportation vehicle. The adaptive aspects are not limited any specific securing structure for securing the chassis to a passenger seat or any other structure.

Figure 2:
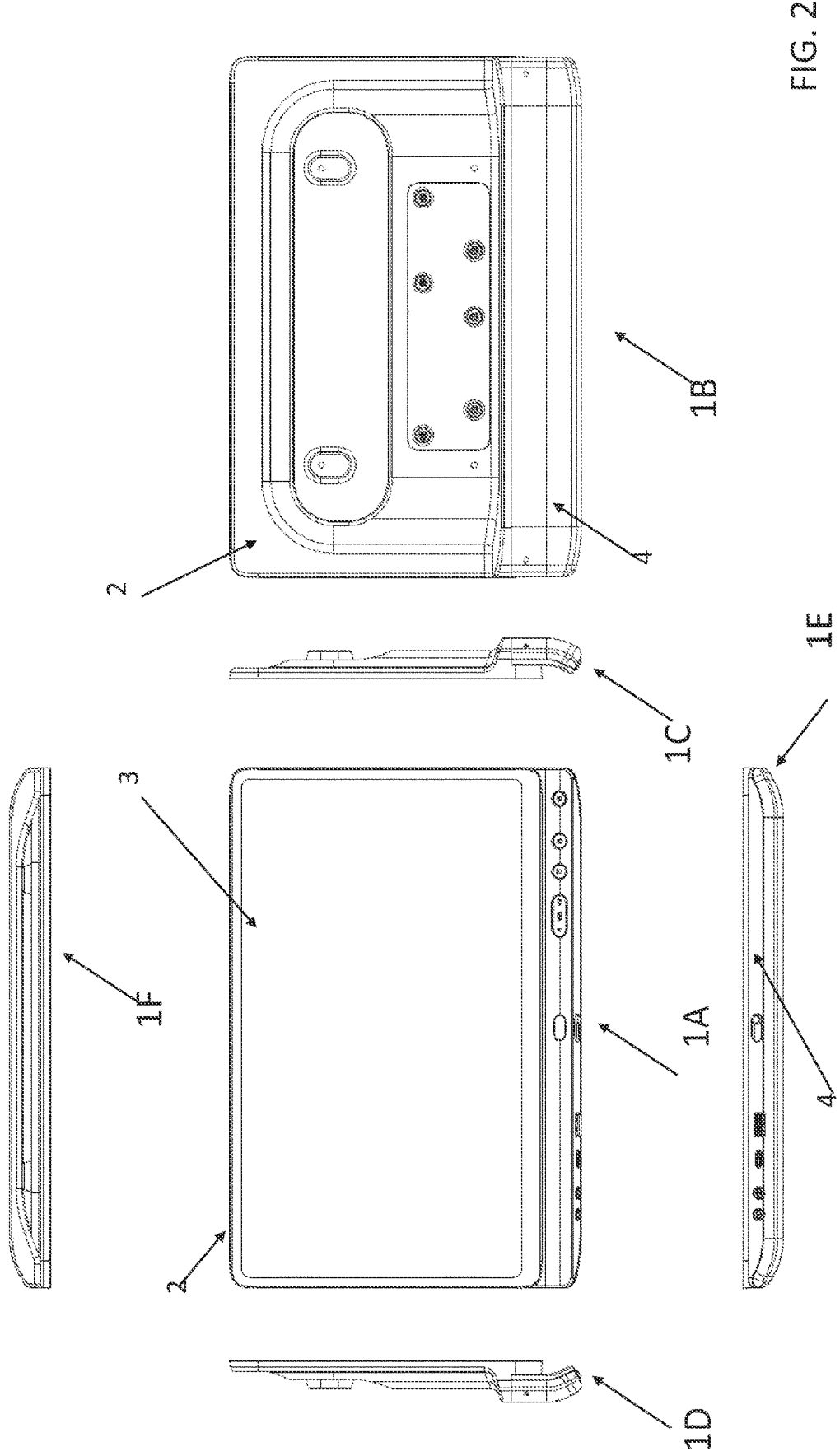
FIG. 2 shows a front, left side, right side, top, bottom and rear view of the display system of FIG. 1, according to one aspect of the present disclosure.

FIG. 2 shows various two-dimensional views of system 1, e.g., 1A shows the front view, 1B shows the rear view, 1C shows a right-side view, 1D shows a left-side view, 1E shows a bottom view, while 1F shows a top view. Details of these various views are provided below.

FIG. 3 shows an exploded front isometric view of the front 1F of display system 1 and a rear isometric view of the rear 1G of system 1, according to one aspect of the present disclosure. The rear isometric view 1G of FIG. 3 is based on rotating the chassis 2 of the rear isometric view of FIG. 1 by 180 degrees in the clockwise direction. As an example, FIG. 3 shows that the peripheral bar assembly 4 includes alignment pins 19A and 19B orthogonal to surface 31A of the peripheral bar assembly 4, latches 13A and 13B that protrude vertically above the horizontal surface 31A and a peripheral bar input/output (also referred to as "IO" or "I/O") connector (also referred to as "connector 20") that protrudes above surface 31A. The rear isometric view 1G shows alignment pin cavities 22A and 22B on a horizontal bottom surface 32A of the chassis 2. The cavities 22A/22B receives the alignment pins 19A and 19B of the peripheral bar assembly 4. The chassis 2 also includes latch cavities 23A and 23B on surface 32A to engage latches 13A and 13B, respectively of the peripheral bar assembly 4.

In one aspect, the connector 20 mates with an I/O connector 21 of the display module 3. This enables electrical connection between the peripheral bar assembly 4 and the display module 3. The alignment pins 19A and 19B in alignment cavities 22A and 22B, latches 13A and 13B in latch cavities 23A and 23B, and connector 20 mating with connecting 21 operationally engage the peripheral bar assembly 4 with the chassis 2/display module 3. This enables a supplier of the peripheral bar assembly 4 to configure the various features described below based on customer (e.g., an airline) requirements and usage. This allows the airline to cost-effectively provide different system 1 configurations at different segments of the aircraft, without having to redesign the entire display system 1, as described below in detail. Furthermore, the peripheral bar assembly can be customized for different size monitors, e.g., 13.3", 15.6" or any other size. It is noteworthy that although latches 13 and alignment pins 19 are shown to couple the peripheral bar assembly 4 with the display module 3/chassis 2, other fastening means can be used to engage the peripheral bar assembly 4 with the display module 3/chassis 2.

Figure 4:
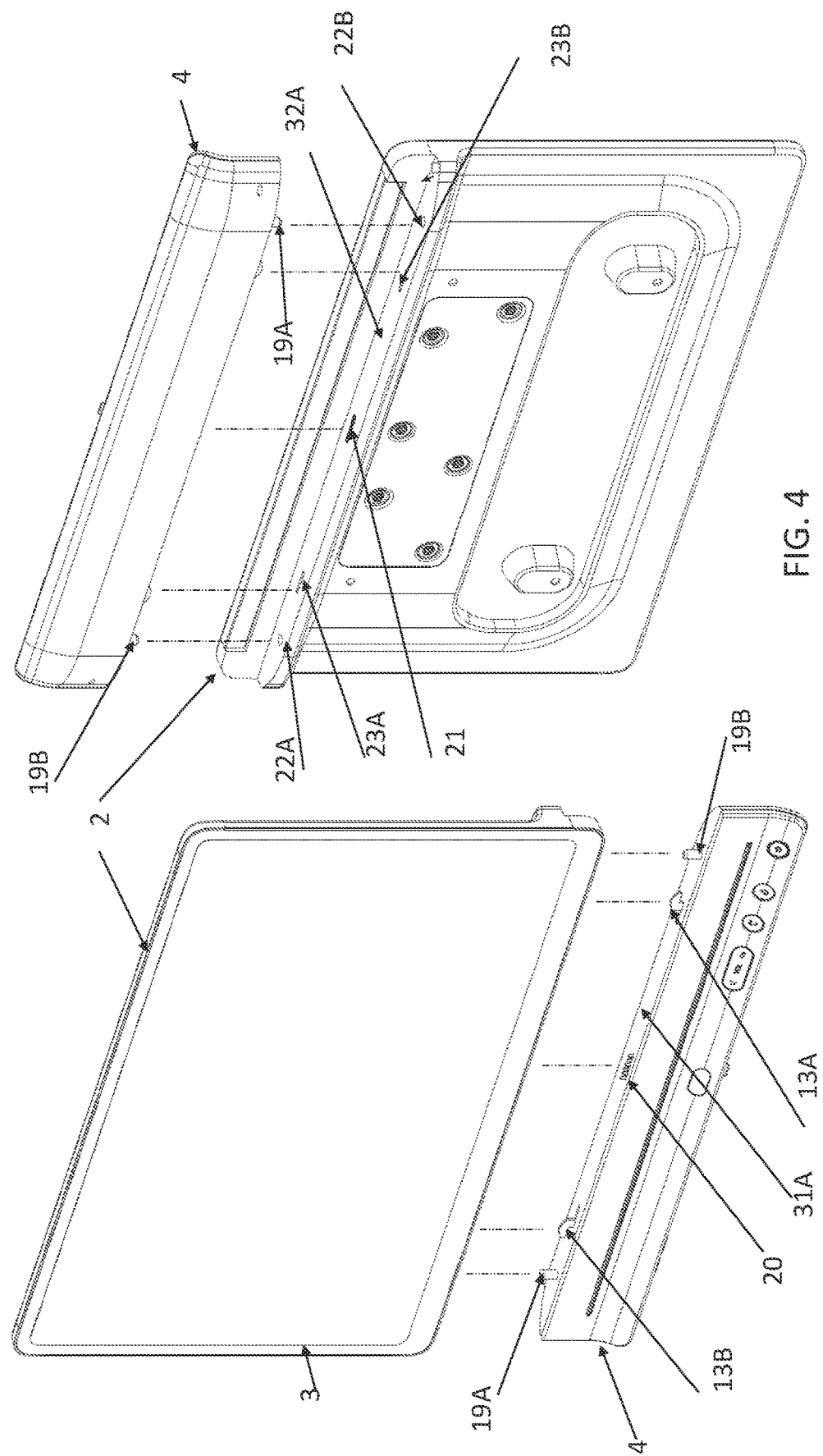
FIG. 4 shows another exploded view of attaching the peripheral housing assembly of the display system of to a display module/chassis, according to one aspect of the present disclosure.

FIG. 4 is like FIG. 3 showing alignment pin 19B aligned with cavity 22A, alignment pin 19A aligned with cavity 22B, aligned connectors 20 and 21 and latches 13A and 13B placed in latch cavities 23B and 23A, respectively to operationally couple the peripheral bar assembly 4 with the display module 3/chassis 2, in one aspect of the present disclosure.

Figure 5A:
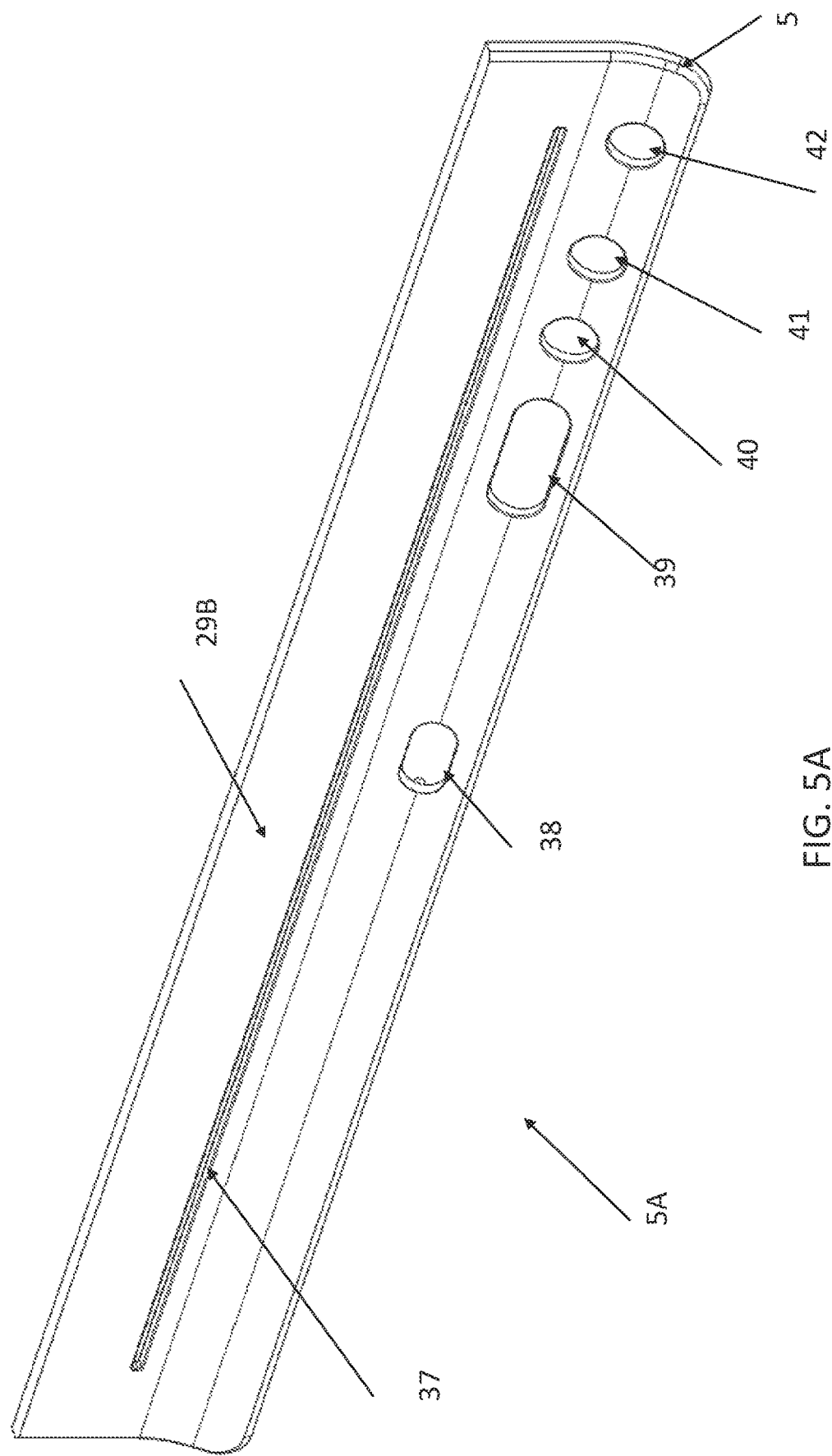
FIG. 5A shows a front isometric view of a front bar housing of the peripheral bar assembly, according to one aspect of the present disclosure.

FIG. 5A shows a front isometric view of a front bar housing 5, referred to as a front segment 5A of the front bar housing 5, according to one aspect of the present disclosure. The front bar housing 5 is operationally coupled to a rear bar housing 6, described below with respect to FIGS. 6A and 6B. The front bar housing 5 and the rear bar housing 6 when operationally coupled results in the peripheral bar assembly 4 described above. In one aspect, the front segment 5A includes an opening 37 through which accent light received from a diffuser 7 shown in FIGS. 14B/14C and described below in detail is transmitted.

In one aspect, the front segment 5A includes a plurality of cavities 38, 39, 40, 41 and 42 located on surface 29B. The adaptive aspects of the present disclosure are not limited to any specific number of cavities or size of cavities. Cavities 38-42 are configured to receives various components/buttons that can be used to interface the peripheral bar assembly 4 with the display module 3. For example, cavity 38 may receive a camera, cavity 39 may receive a volume control button, cavity 40 may receive a light control button, cavity 41 may receive a "call" button, while cavity 42 may receive a "power" on and off button. The various adaptive aspects of the present disclosure are not limited to any specific button or functionality. The cavities may be configured to present different functionality buttons via the front bar housing 5.

Figure 5B:
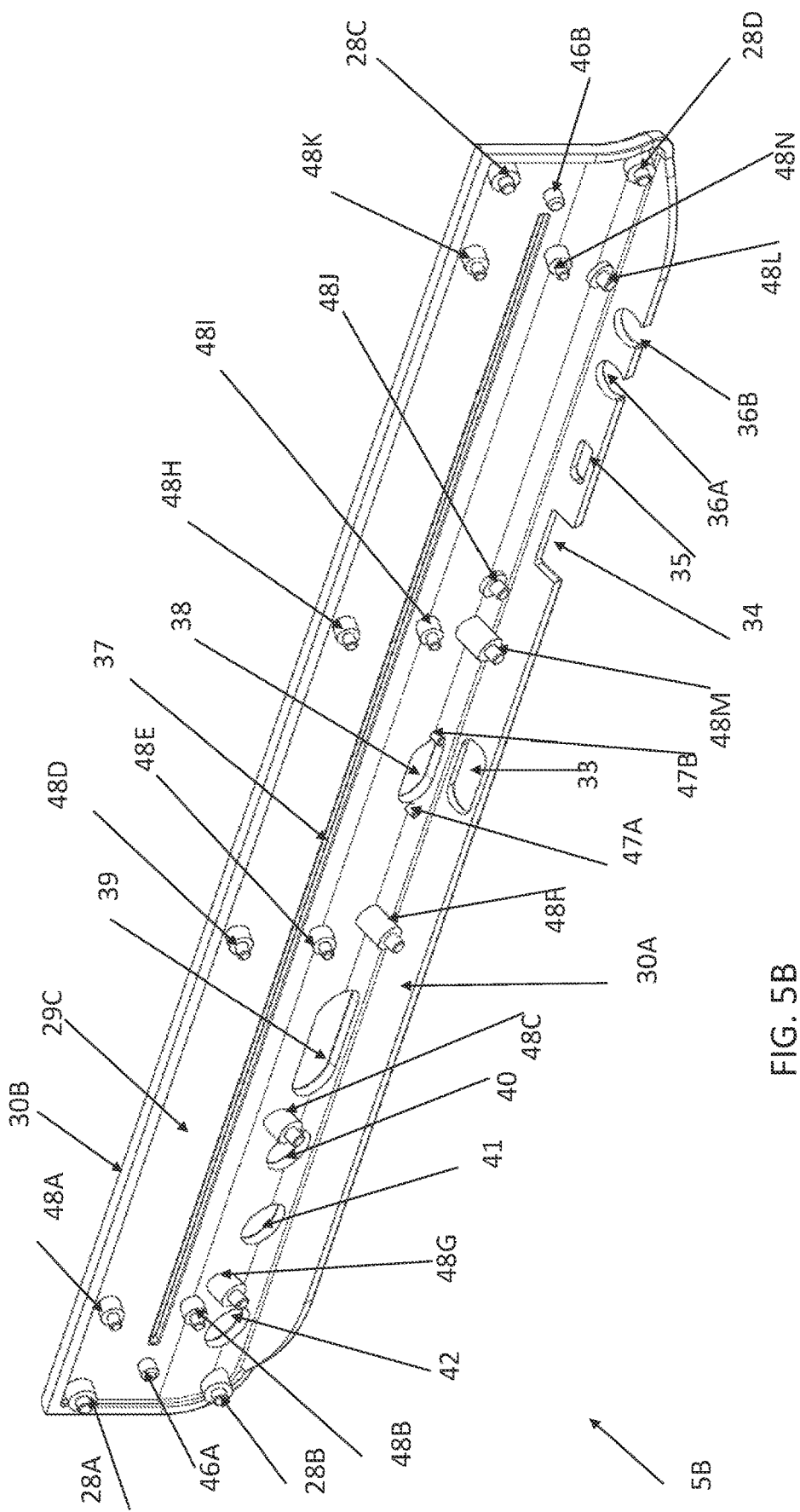
FIG. 5B shows a rear isometric view of the front bar housing of the peripheral bar assembly, according to one aspect of the present disclosure.

FIG. 5B shows a rear isometric view of the front bar housing 5, referred to as a rear segment 5B, according to one aspect of the present disclosure. The rear segment 5B of the front bar housing 5 includes various alignment protruding elements that interface with the front segment of the rear bar housing 6, described below in detail. As an example, the protruding elements include 28A-28D, 46A-46B, 47A-47B and 48A-48N orthogonal to surface 29C of the rear segment 5B. The use of the protruding elements is described below in detail.

The rear segment 5B includes openings 39, 40, 41 and 42 on surface 29C that are used to receive various buttons of a button PCB 11 described below in detail. The rear segment 5B includes openings 38 on surface 29C that is used to receive a camera lens 16, also described below in detail.

The rear segment 5B of the rear bar housing 5 includes a horizontal surface 30A orthogonal to surface 29C with cavities 34, 35 and 36A and 36B that are used to provide connectors and other interface of an IJU PCB 9, as described below in detail. The rear segment 5B also includes an opening 33 that receives a camera slider 17, as described below in detail.

Figure 6A:
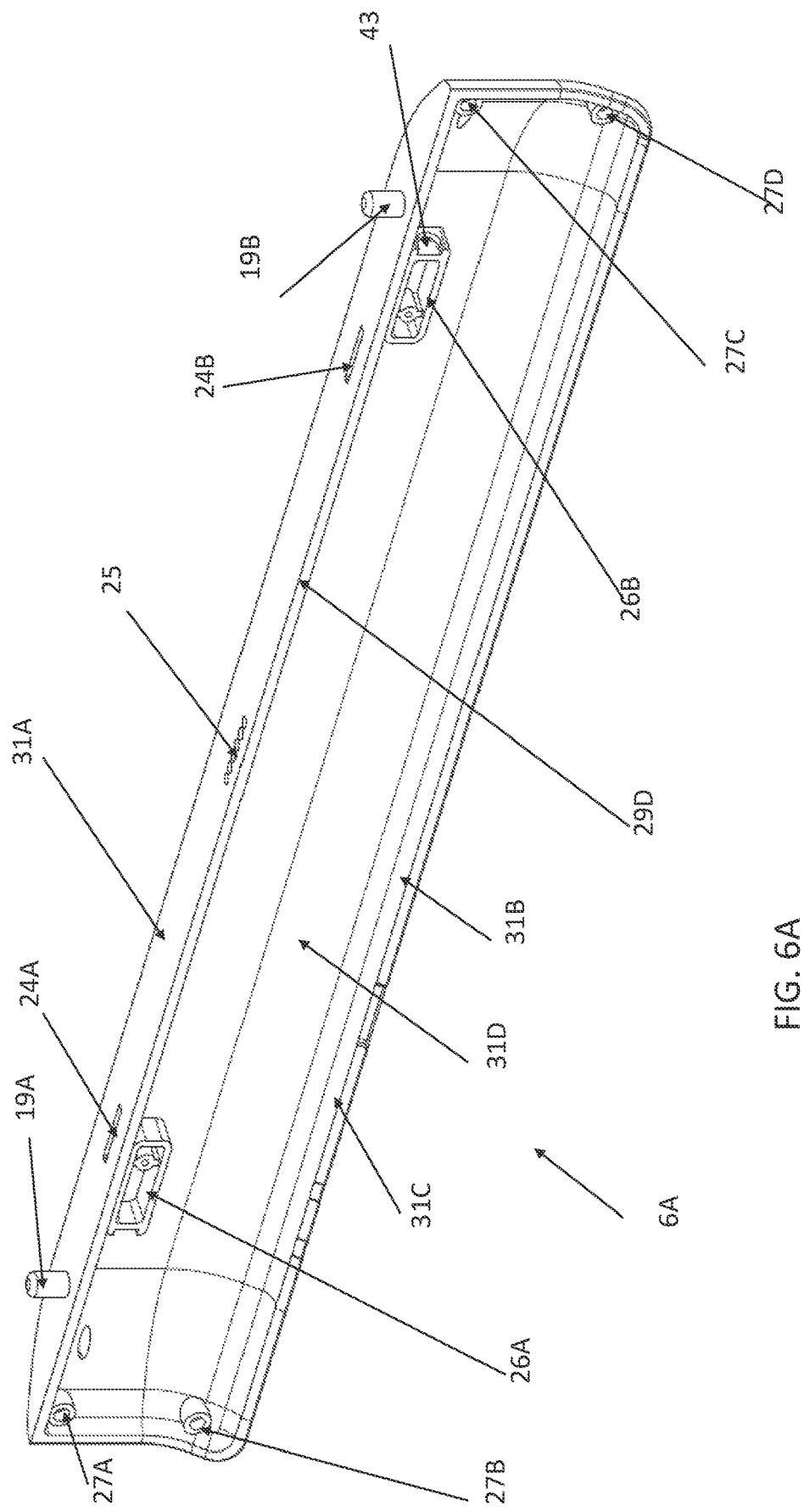
FIG. 6A shows a front isometric view of a rear bar housing of the peripheral bar assembly, according to one aspect of the present disclosure.

FIG. 6A shows a front segment (view) 6A of the rear bar housing 6 that is connected to the front bar housing 5 to provide the peripheral bar housing 4, according to one aspect of the present disclosure. As shown in FIG. 6A, the front segment 6A has a top surface 31A symmetrical to surface 31B to create an opening 31D. The front segment 6A includes a surface 29D that is orthogonal to surface 31A and surface 31C that is orthogonal to surface 31B. Both surface 29D and 31C mate with the corresponding surfaces of the front bar housing 5 rear segment, as described below in detail.

In one aspect, the front segment 6A further includes cavities 26A and 26B parallel to surface 31A to receive latches 13A/13B, as described below. Cavities 26A/26B include an opening 43 for placing a spring 14 (FIG. 15) to hold the latches 13A/13B in place, as described below. A portion of the latches 13A/13B protrudes from cavities 24A and 24B located on the horizontal surface 31A of the rear bar housing 6.

In one aspect, the front segment 6A includes an opening that receives the I/O connector 20 (FIG. 3) that connects with the I/O connector 21 to provide power and signals to the display module 3. The front segment 6A further includes cavities 27A-27D that receive the protruded segments 28A-28D of the front bar housing 5 shown in FIG. 5B.

In one aspect, the front segment 6A includes the alignment pins 19A/19B that are orthogonal to surface 31A. As shown in FIG. 3, the alignment pins 19A/19B are used to align the peripheral bar housing 4 with the chassis 2/display module 3.

Figure 6B:
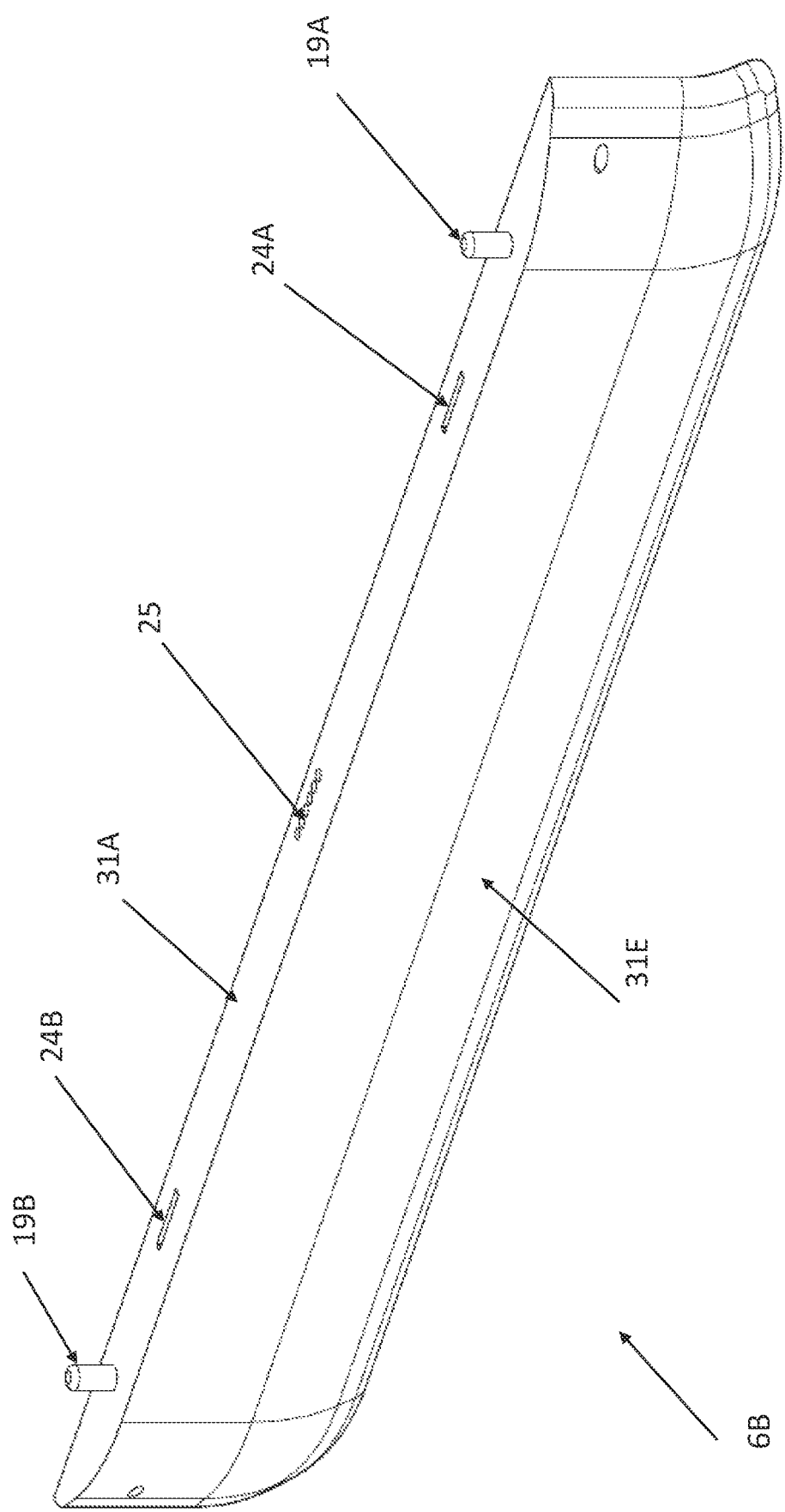
FIG. 6B shows a rear isometric view of the rear bar housing of the peripheral bar assembly, according to one aspect of the present disclosure.

FIG. 6B shows a rear segment (view) 6B of the rear bar housing 6, according to one aspect of the present disclosure. The rear segment 6B includes an outer wall 31E that provides a casing for the rear side of the peripheral bar housing assembly 4. The rear segment 6B also shows the alignment pins 19A/19B, latch cavities 24A/24B, and connector cavity 25 on surface 31A, described above in detail.

Figure 7A:
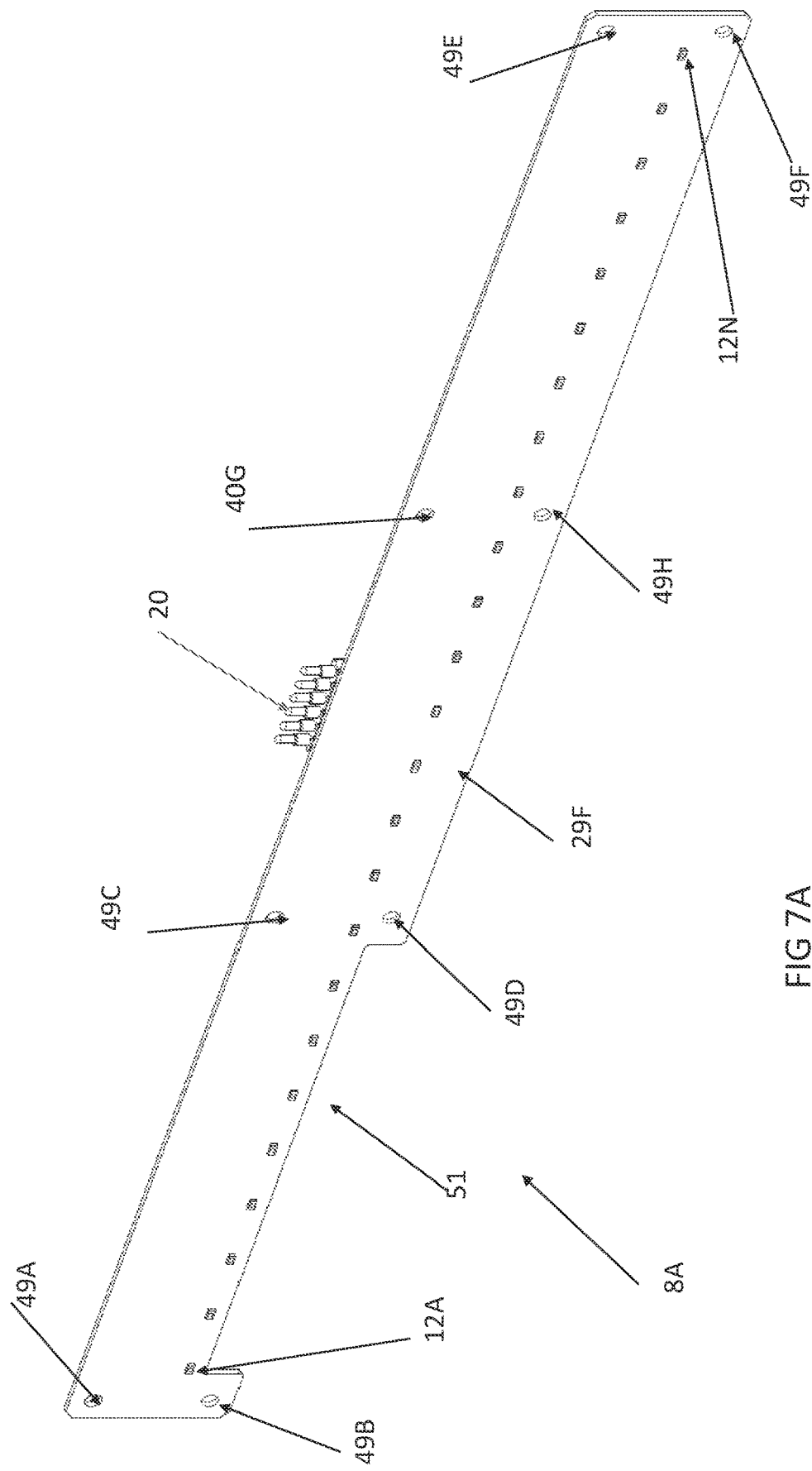
FIG. 7A shows a front isometric view of an I/O PCB ("Printed Circuit Board) of the peripheral bar assembly, according to one aspect of the present disclosure.

FIG. 7A shows a front segment (view) 8A of a I/O PCB 8, used according to one aspect of the present disclosure. The front segment 8A shows surface 29F that is placed against surface 29R of the diffuser 7 (FIG. 14C). The front segment 8A shows the connector 20 that connects with connector 21 to provide power and signaling to the display module 3. The front segment 8A includes a plurality of openings 49A-49H that are used to fasten the I/O PCB 8 to the front bar housing 5, as described below with respect to FIG. 16A.

In one aspect, the front segment 8A further shows a cut-out 51 that is used to place the I/O PCB 8 parallel to the horizontal surface 30A of the rear segment 5B of the front bar housing 5, as described below in detail with respect to FIG. 16A. In another aspect, the front segment 8A shows a plurality of light sources 12A-12N (also referred to as light source 12 or light sources 12) that are used to provide accent lighting via the display system, as described below in detail.

Figure 7B:
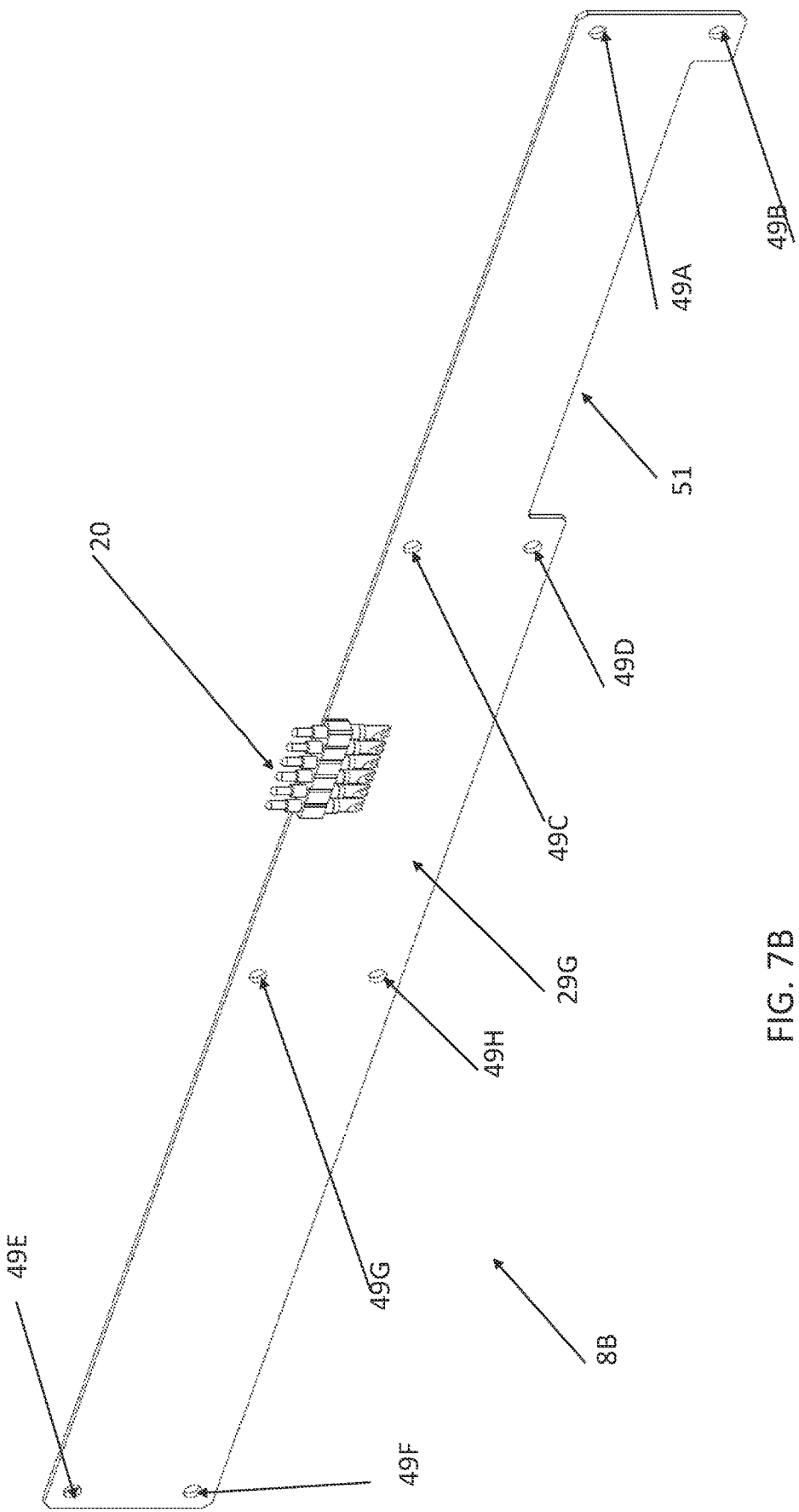
FIG. 7B shows a rear isometric view of the I/O PCB of the peripheral bar assembly, according to one aspect of the present disclosure.

FIG. 7B shows a rear segment (view) 8B of the I/O PCB 8, according to one aspect of the present disclosure. The rear view 8B also shows openings 49A-49H are through openings. The rear segment 8B has surface 29G opposite surface 29F, described above with respect to FIG. 7A.

Figure 8B:
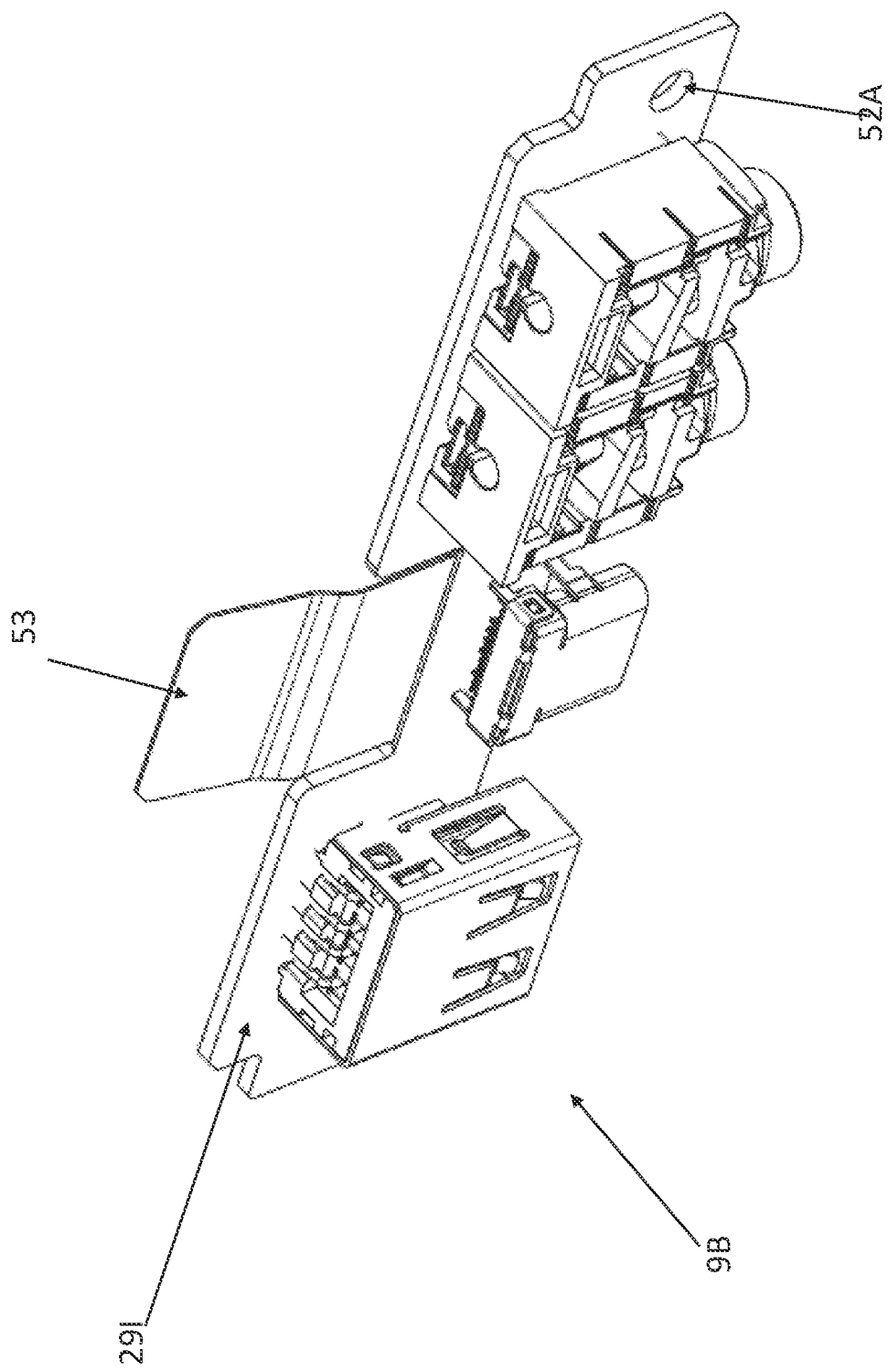
FIG. 8B shows a rear isometric view of the IJU PCB of the peripheral bar assembly, according to one aspect of the present disclosure.

FIG. 8A shows an example of a front segment (view) 9A of an IJU PCB 9, and FIG. 8B shows an example of a rear segment (view) 9B of the IJU PCB 9, according to one aspect of the present disclosure. The IJU PCB 9 provides various connectors and jacks to a user, e.g., a USB connector, Ethernet jack, or any other jack/connector on surface 29I of the rear segment 9B, as shown in FIG. 8B. The adaptive aspects of the present disclosure are not limited to any specific type of jack/connector. The front segment 9A includes openings 52A and 52B on surface 29H that are used to fasten the IJU PCB 9 to the rear segment 5B of the front bar housing 5, as described below in detail with respect to FIG. 18A.

In one aspect, IJU PCB 9 includes a tongue shaped extension 53 that extends from surface 29H/29I to connect the IJU PCB 9 to the front bar housing 5, as described below in detail.

Figure 9A:
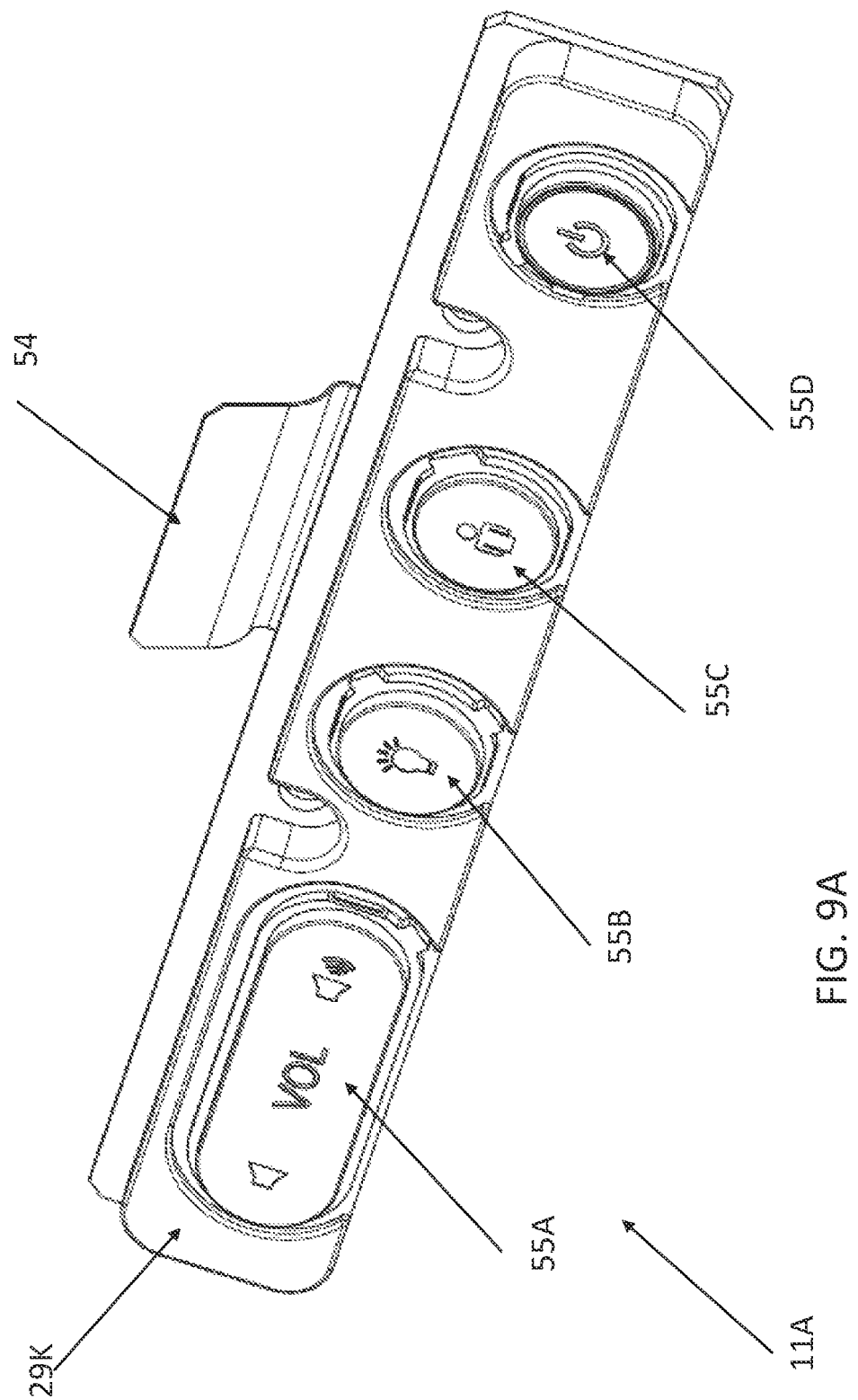
FIG. 9A shows a front isometric view of a button PCB of the peripheral bar assembly, according to one aspect of the present disclosure.
Figure 9B:
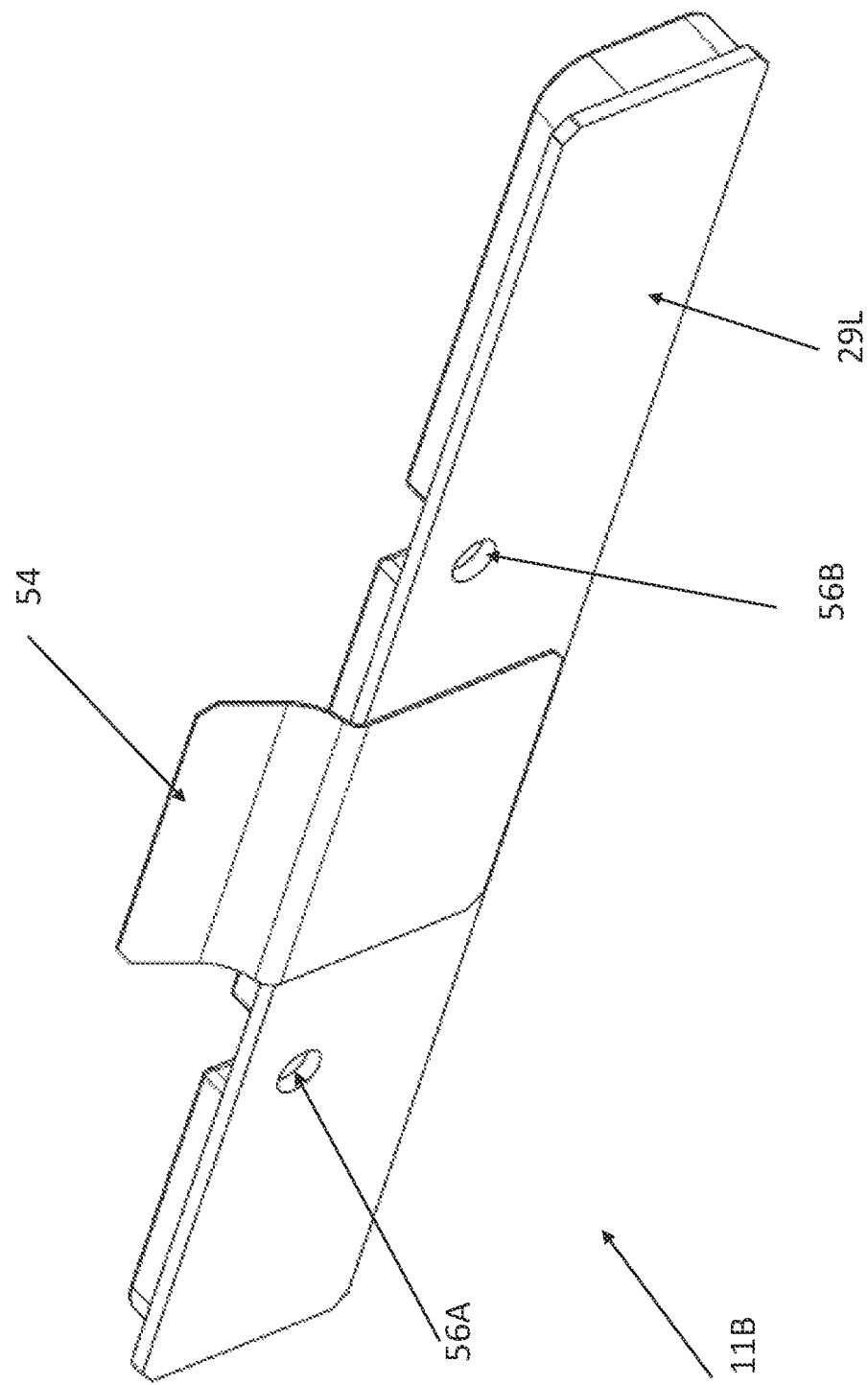
FIG. 9B shows a rear isometric view of the button PCB of the peripheral bar assembly, according to one aspect of the present disclosure.

FIG. 9A shows an example of a front segment (view) 11A of a button PCB 11, according to one aspect of the present disclosure. FIG. 9B shows an example of a rear segment (view) 11B of a button PCB 11, according to one aspect of the present disclosure. Button PCB 11 provides a plurality of buttons 55A-55D on surface 29K to enable certain functions of system 1. For example, button 55A made available via opening 39 (FIG. 5A) of the front segment 5A of the front bar housing is used for volume control, button 55B made available via opening 40 (FIG. 5A) is used for light control, button 55C made available via opening 41 (FIG. 5A) is used to call an attendant and button 55D made available via opening 42 (FIG. 5A) is used for power on and off. The adaptive aspects of the present disclosure are not limited to any specific number of buttons or any specific function.

Button PCB 11 includes extension 54 extending from 29K and surface 29L of the rear segment 11B to engage/couple the button PCB 11 to the front bar housing 5, as described below.

In one aspect, the rear segment 11B includes openings 56A and 56B on surface 29L to connect the button PCB 11 to the front bar housing 5, as described below in detail with respect to FIG. 18A.

Figure 10A:
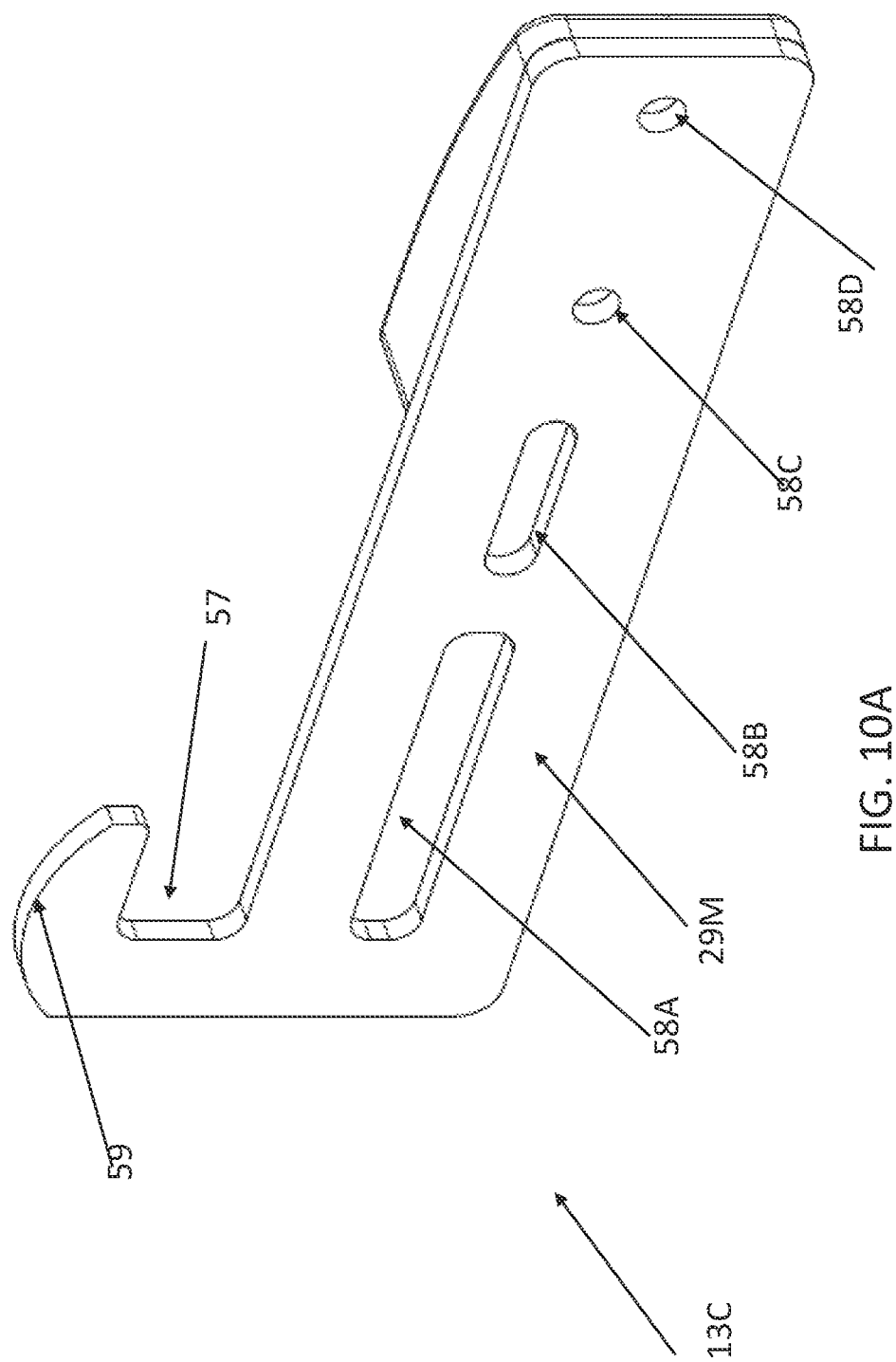
FIG. 10A shows a front isometric view of a latch used by the peripheral bar assembly, according to one aspect of the present disclosure.
Figure 10B:
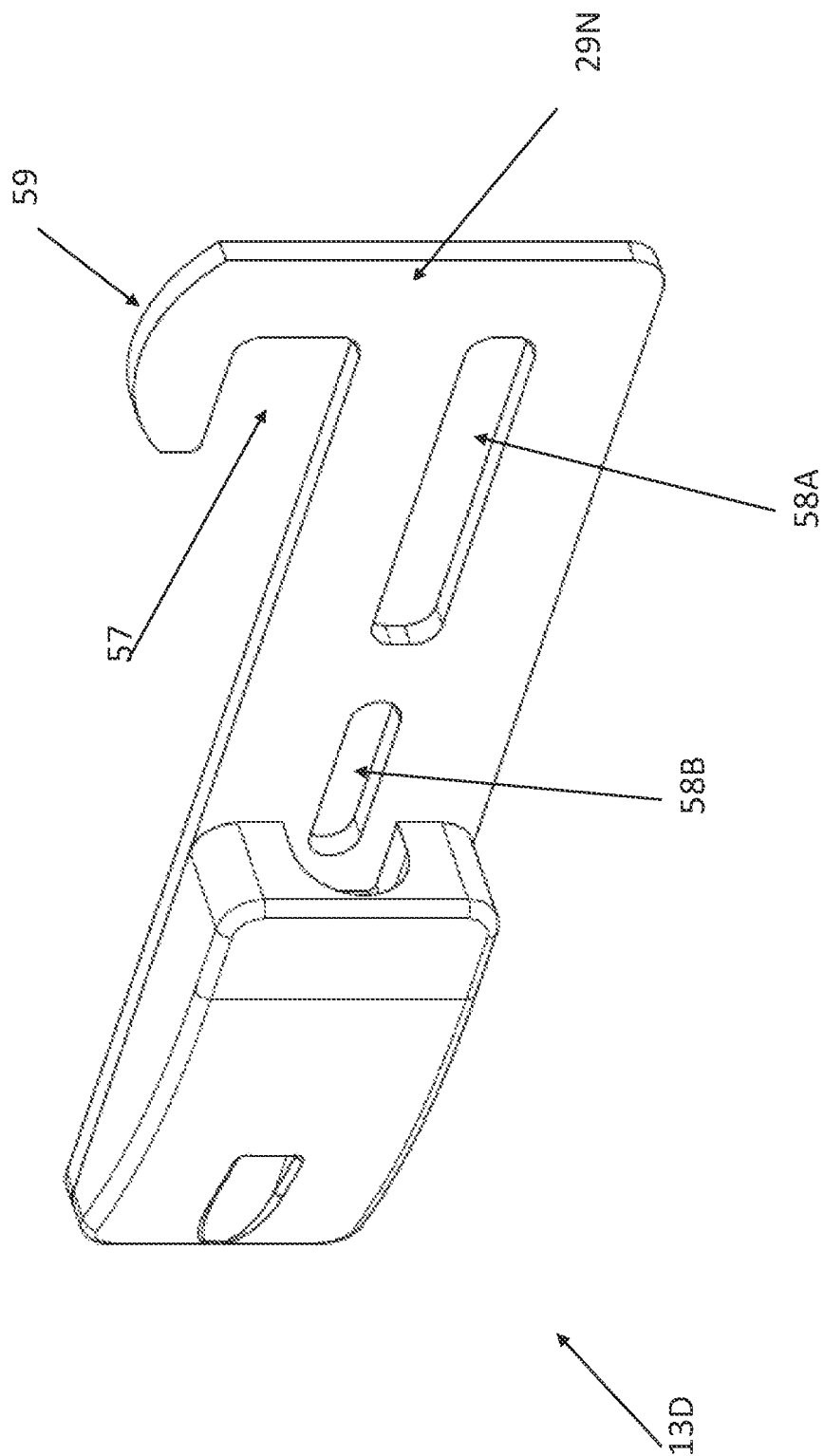
FIG. 10B shows a rear isometric view of latch used by the peripheral bar assembly, according to one aspect of the present disclosure.

FIG. 10A shows a front segment (view) 13C of a latch 13 with surface 29M, according to one aspect of the present disclosure. FIG. 10B shows a rear segment (view) 13D of a latch 13 with surface 29N, according to one aspect of the present disclosure. Latch 13 includes a plurality of openings 58A-58D on surface 29M/29N that are used to connect the latch 13 to the rear bar housing 6, as described below in detail with respect to FIG. 19A. Latch 13 further includes prong 59 with spacing 57 that engages in latch cavities 23A and 23B to connect the peripheral housing 4 to display module 3/the main chassis 2 (FIG. 3), as described below in more detail.

Figure 11A:
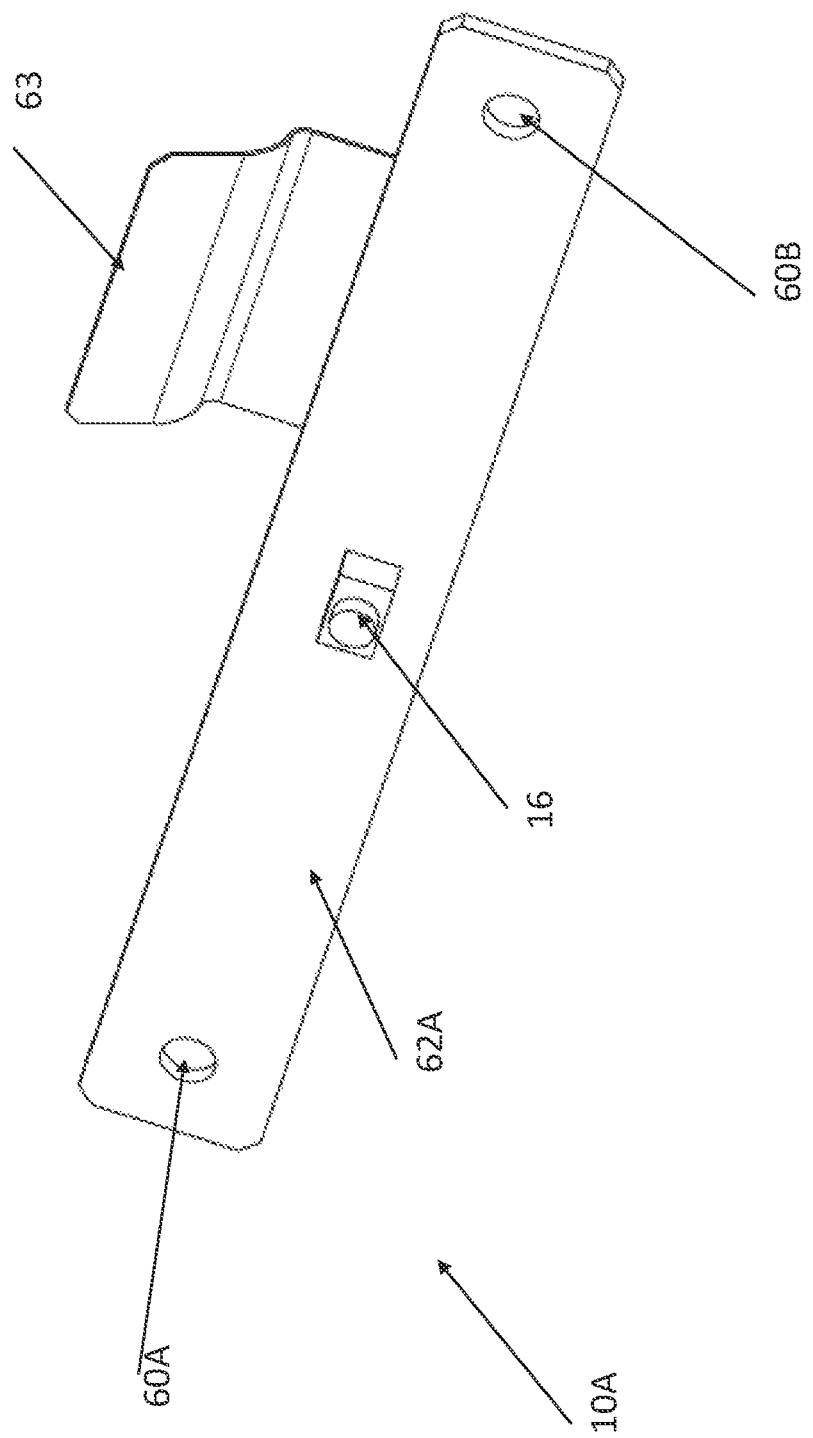
FIG. 11A shows a front isometric view of a Bluetooth/camera PCB of the peripheral bar assembly, according to one aspect of the present disclosure.
Figure 11B:
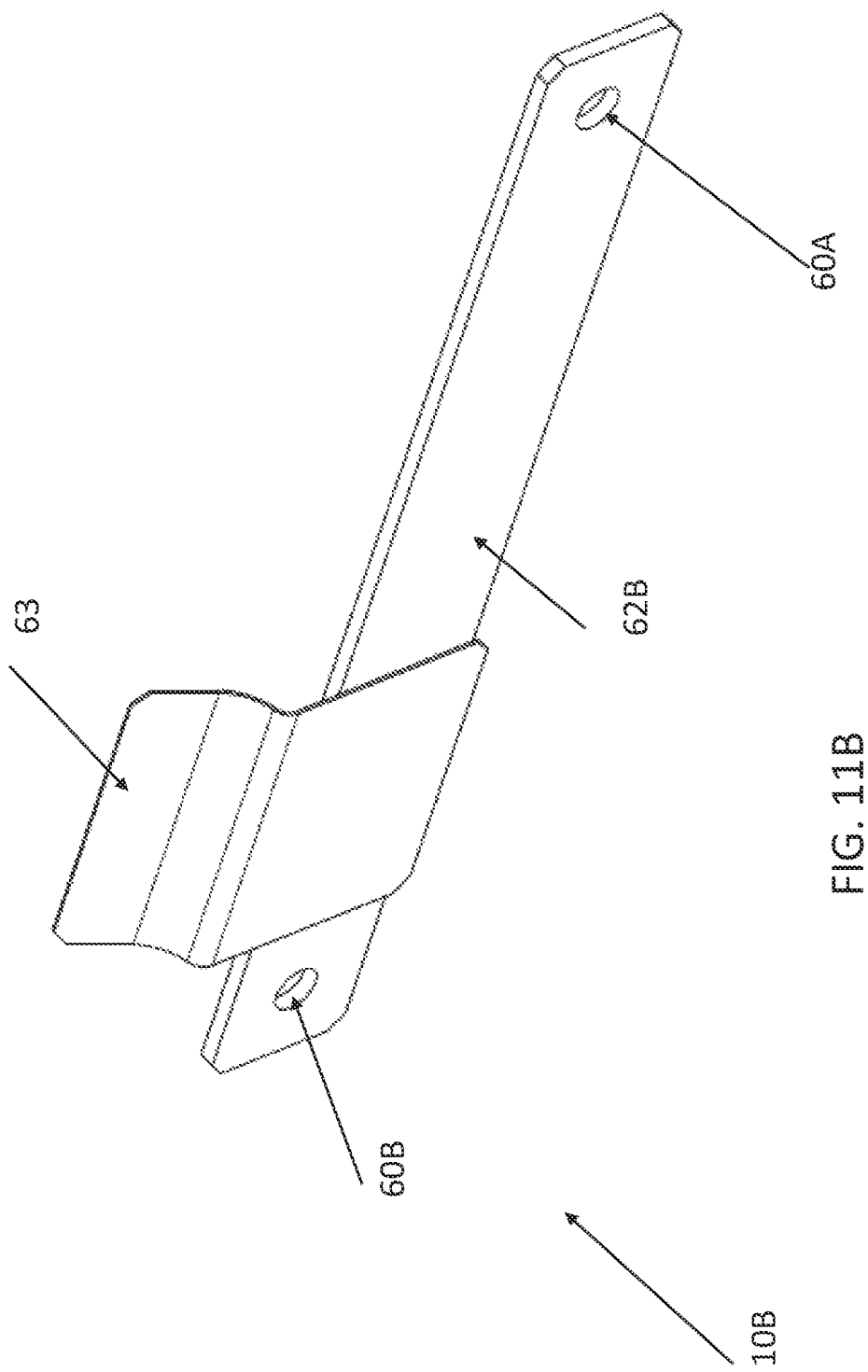
FIG. 11B shows a rear isometric view of the Bluetooth/camera PCB of the peripheral bar assembly, according to one aspect of the present disclosure.

FIG. 11A shows a front segment (view) 10A of a Bluetooth/camera PCB 10 (referred to as PCB 10) with surface 62A, according to one aspect of the present disclosure. FIG. 11B shows a rear segment (view) 10B of PCB 10 with surface 62B, according to one aspect of the present disclosure. The front segment 10A surface 62A includes camera lens 16 and openings 60A/60B. The openings 60A-60B are used to fasten the PCB 10 using prongs 48F-48M (FIG. 5B) located in the rear segment 5B of the front bar housing 5, as shown in FIG. 18A. PCB 10 further includes a tongue shaped structure 63 extending from surface 62A and 62B that is used to place PCB 10 under the I/O PCB 8, as shown in FIGS. 18A/18B.

Figure 17A:
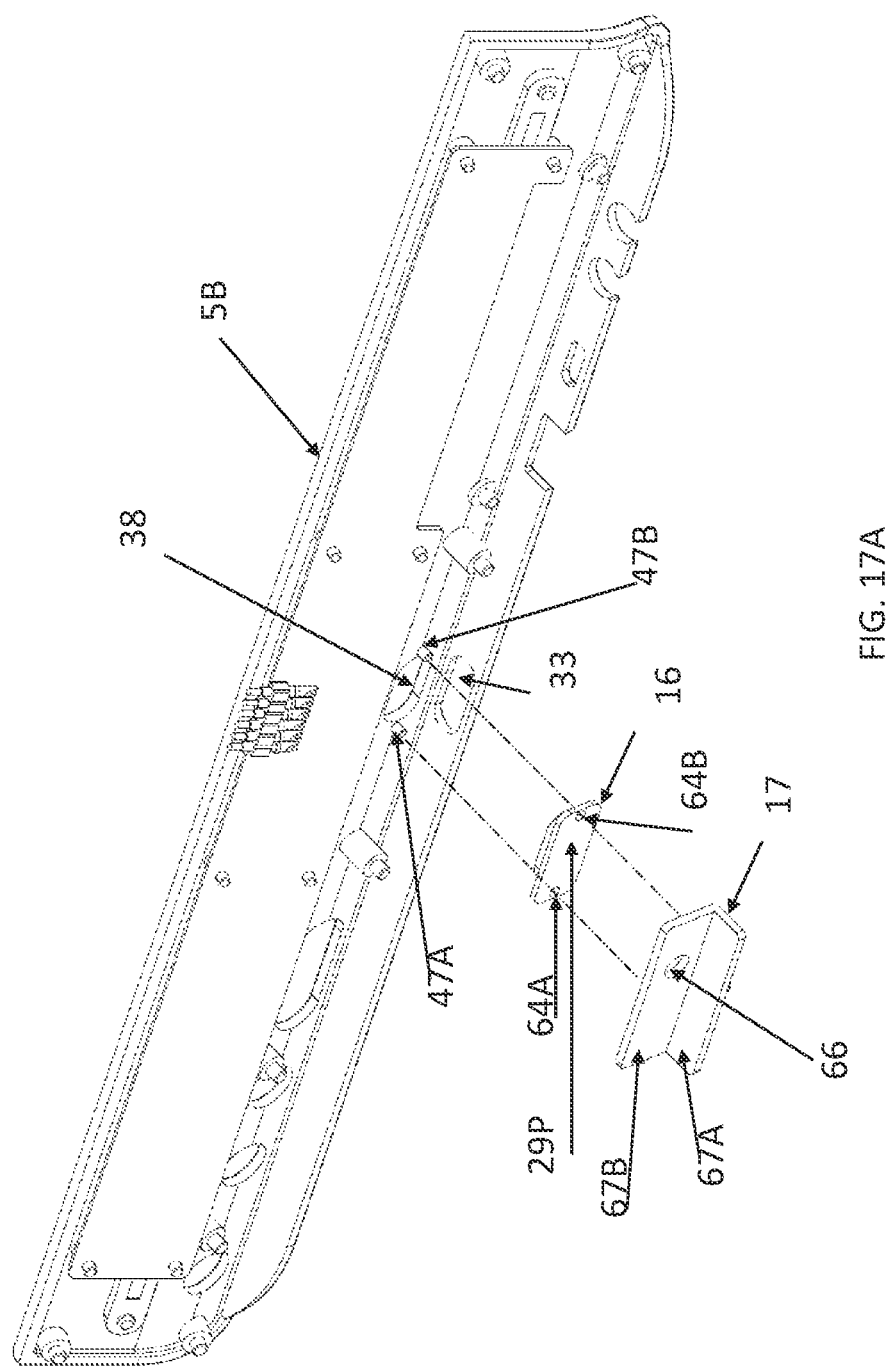
FIG. 17A shows an exploded view of attaching the camera lens and the camera slider to the front bar housing, according to one aspect of the present disclosure.

FIG. 12 shows a front segment (view) 16A of the camera lens assembly (also referred to as camera lens) 16 with a protruded lens element 65 extending from surface 64C of the front segment 16A, and a rear segment (view) 16B with surface 29P, according to one aspect of the present disclosure. Surface 29P is placed against surface 67E (FIG. 13) of a camera slider 17 and openings 64A and 64B are used to fasten the camera lens 16 on the rear bar housing 6 and the camera slider 17 as shown in FIGS. 17A/17B.

Figure 13:
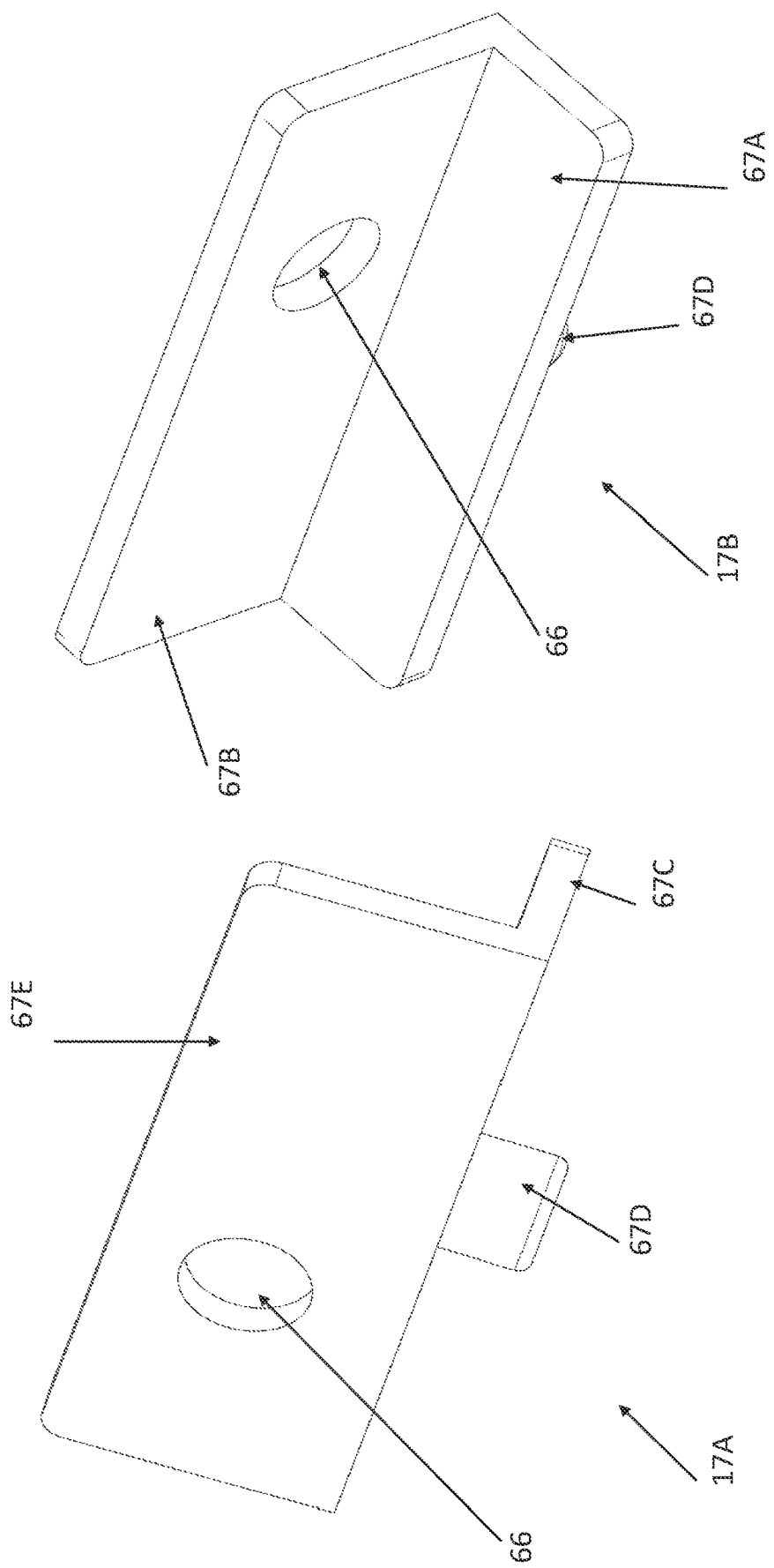
FIG. 13 shows a front isometric and a rear isometric view of a camera slider, used according to one aspect of the present disclosure.

FIG. 13 shows a front segment (view) 17A of the camera slider 17, and a rear segment (view) 17B of the camera slider 17, according to one aspect of the present disclosure. Camera slider 17 includes an opening 66 that is aligned with the camera lens 16, when the camera lens 16 is in use. Camera slider 17 includes a horizontal surface 67A and a vertical surface 67B in the rear segment 17 and the surface 67E in the front segment 17A. The camera slider 17 also includes an extended structural elements 67C and 67D that are placed within opening 33 of the rear segment 5B of the front bar housing 5, shown in FIG. 5B. Details of assembling the camera slider 17 are provided below with respect to FIGS. 17A/17B.

FIG. 14A shows a front segment (view) 12A of a light source 12, and a rear segment (view) 12B of the light source 12, according to one aspect of the present disclosure. The light source 12 has a light emitting source 68 and rear surface 69 that is placed in a LED PCB 15/PCB 8, as described below in detail.

Figure 14B:
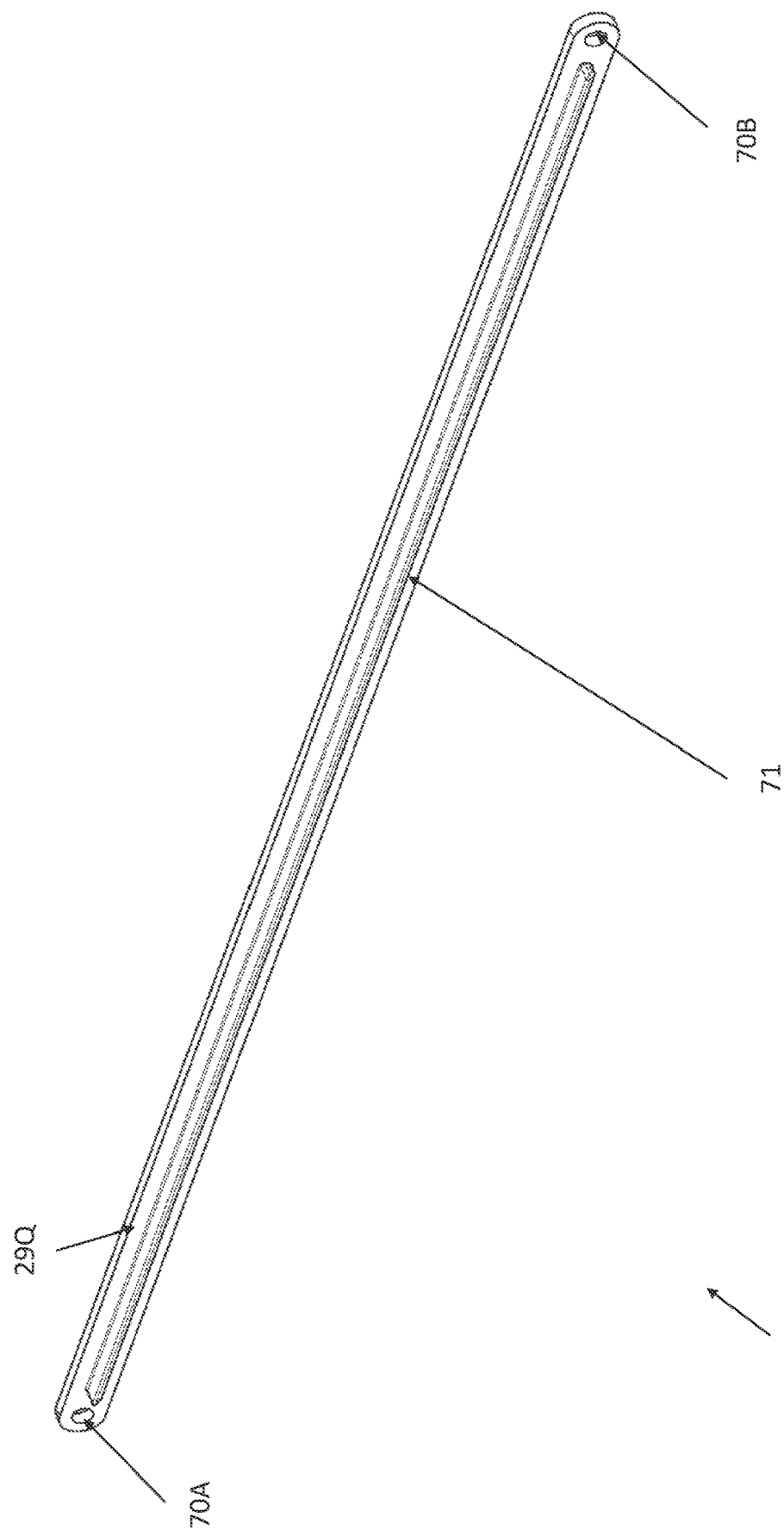
FIG. 14B shows a front isometric of a light source, used according to one aspect of the present disclosure.
Figure 14C:
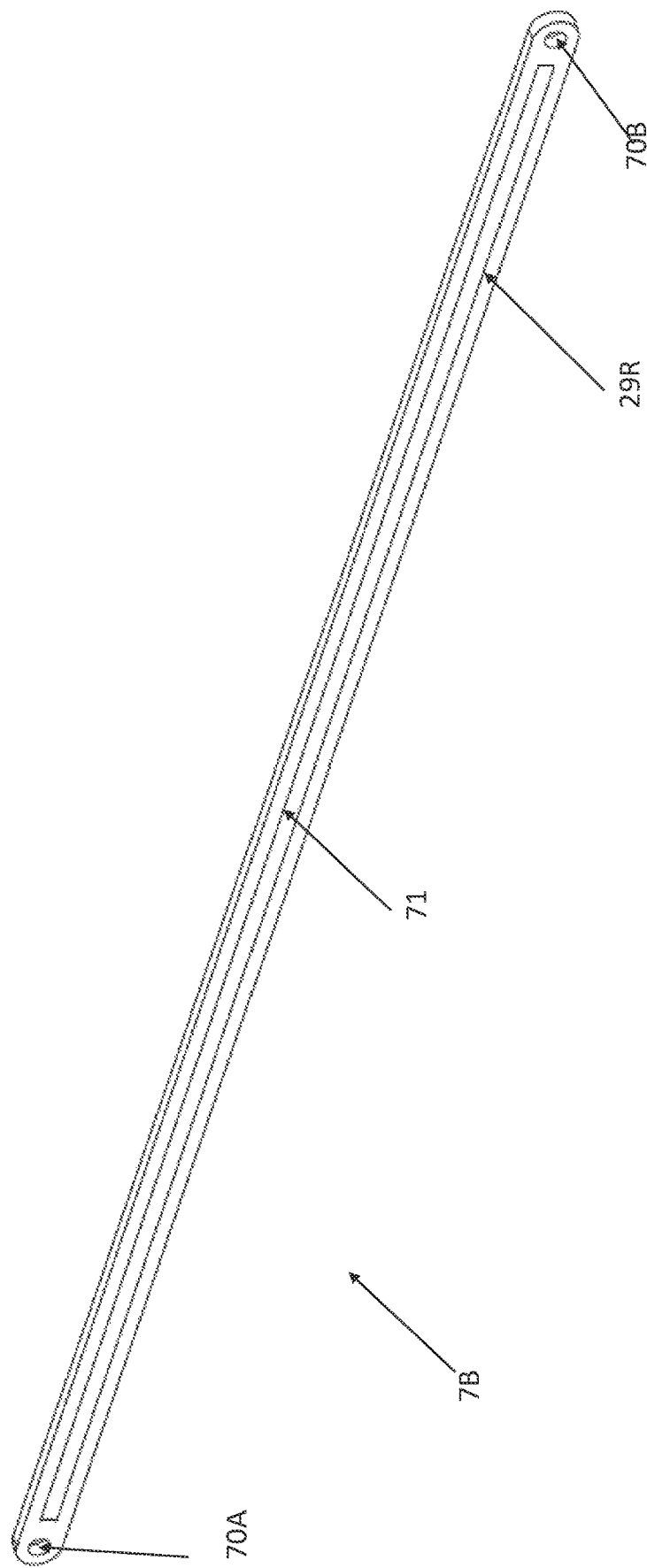
FIG. 14C shows a rear isometric view of the light source, used according to one aspect of the present disclosure.

FIG. 14B shows a front segment (view) 7A of the diffuser 7 with surface 29Q, and FIG. 14C shows a rear segment (view) 7B of the diffuser 7 with surface 29R, according to one aspect of the present disclosure. Diffuser 7 includes openings 70A and 70B that are used to attach the diffuser 7 to the I/O PCB 8 and the rear segment 5B of the front bar housing 5, as described below in detail with respect to FIG. 16A. Diffuser 7 includes an opening 71 that receives light from the light source 12 (e.g., light emitting diode (LEDs)) to provide diffused accent lighting from the bottom edge of the system 1, as described below in detail.

Figure 14D:
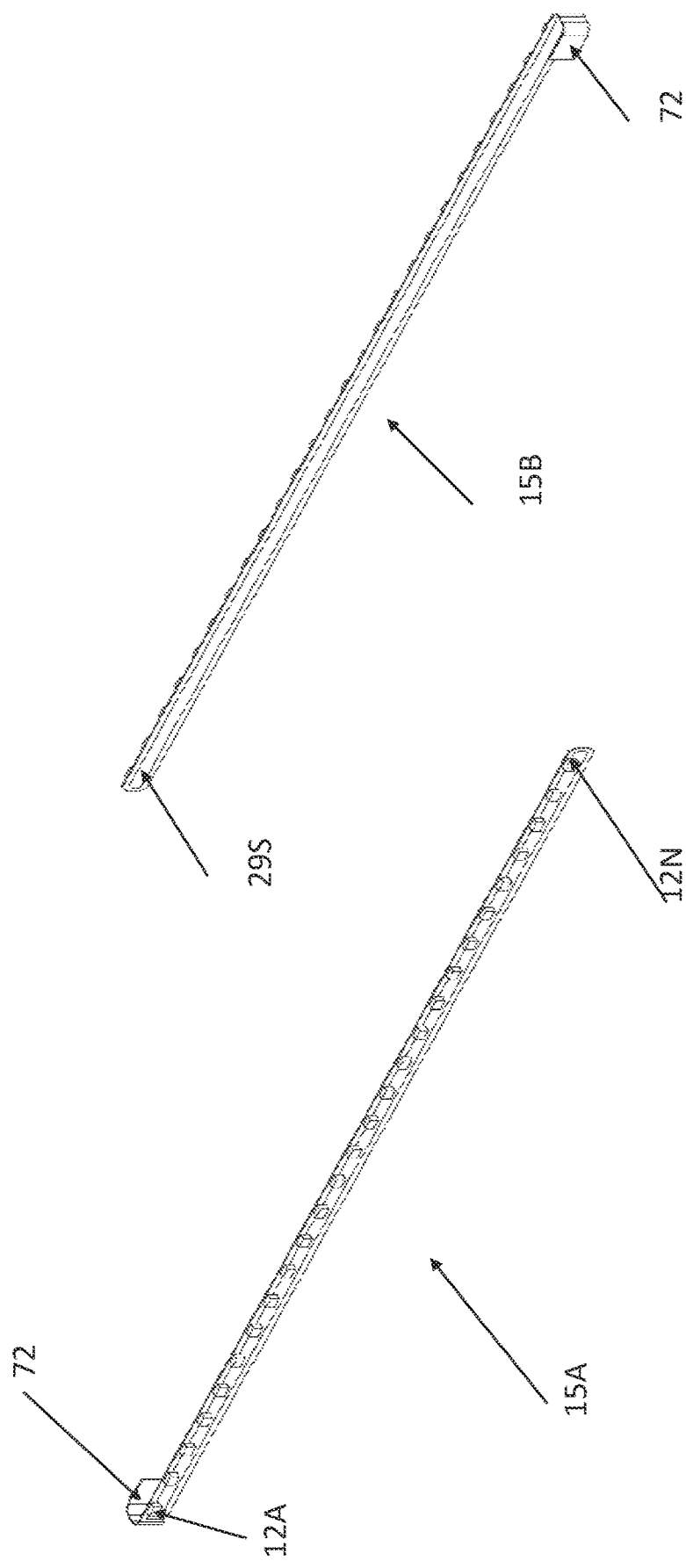
FIG. 14D shows a front isometric and a rear isometric view of a LED (light emitting diode), used according to one aspect of the present disclosure.

FIG. 14D shows a front segment (view) 15A of the LED PCB 15, and a rear segment (view) 15B with surface 29S and a curved structure 72 of the LED PCB 15, according to one aspect of the present disclosure. An array of light source 12 in placed in the LED PCB 15 to provide light that is diffused by the diffuser 7. The curved structure 72 is used to place the LED PCB within the I/O PCB 8. The assembly of the LED PCB 15 is described below in detail with respect to FIG. 16A.

Figure 15:
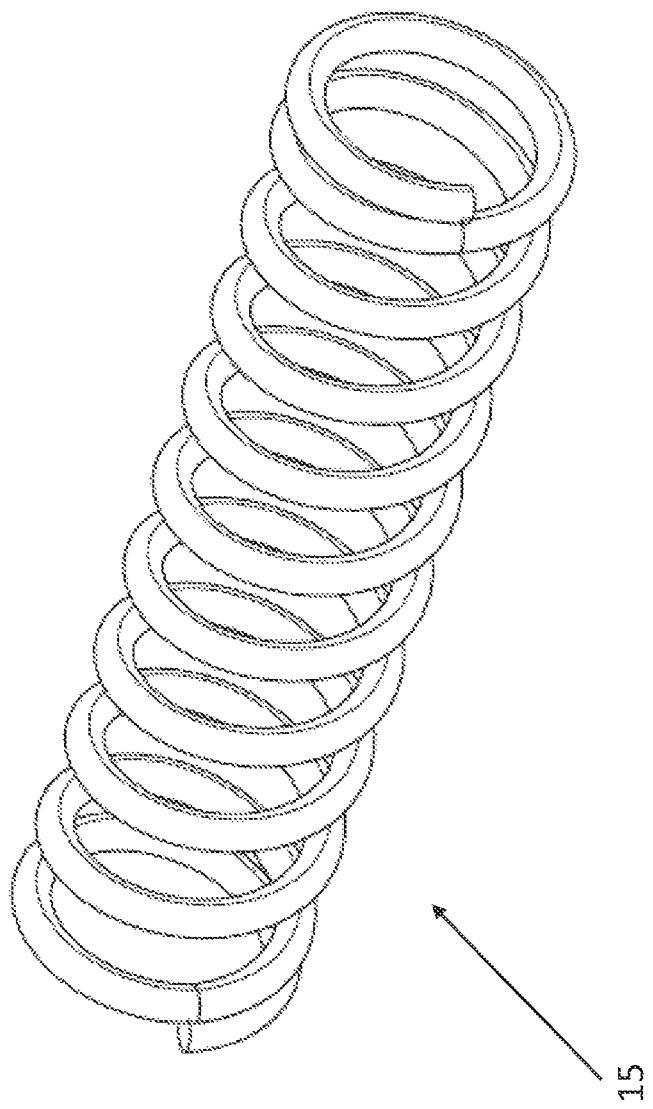
FIG. 15 shows an isometric view of a spring, used according to one aspect of the present disclosure.
Figure 19A:
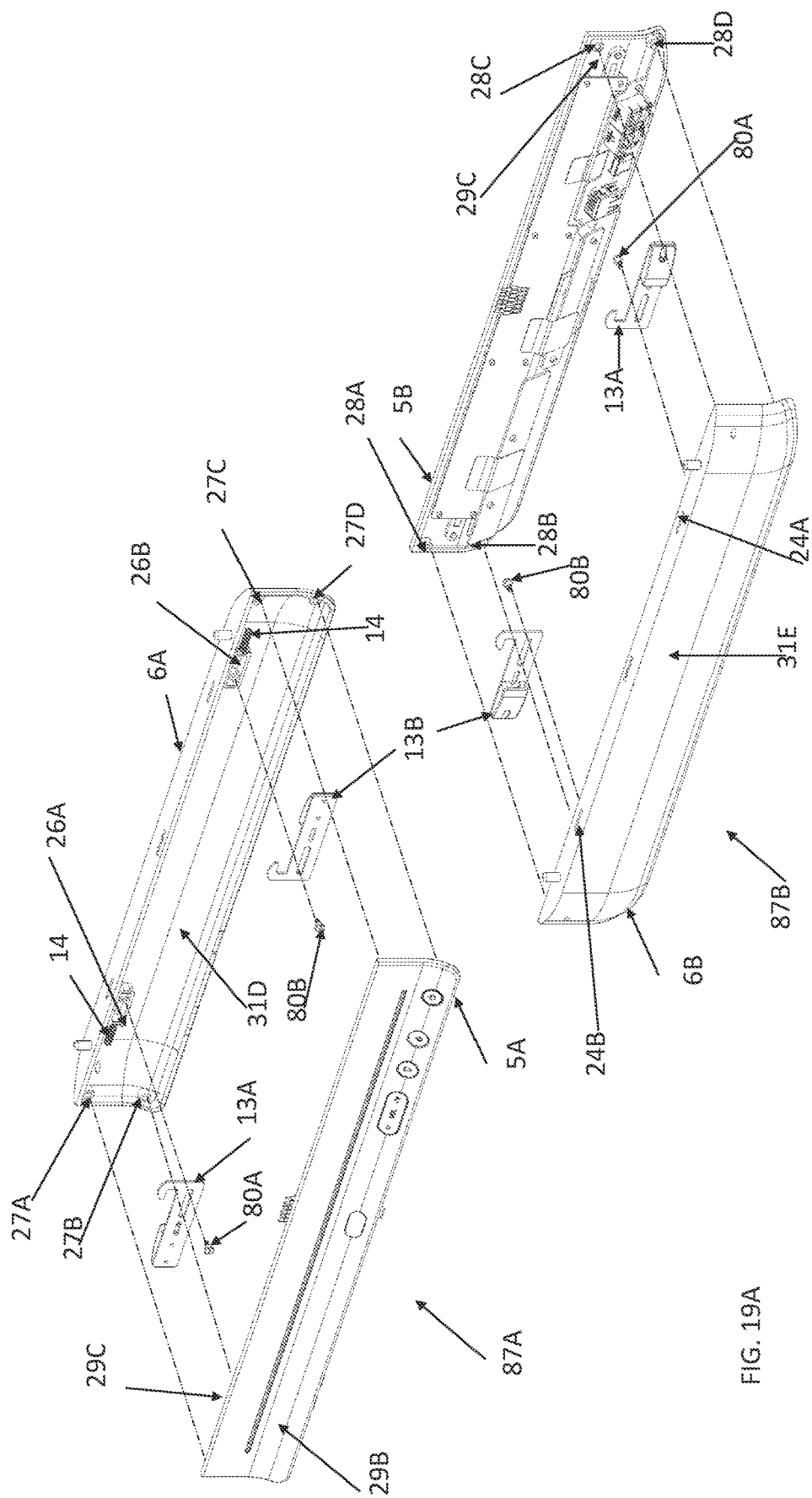
FIG. 19A shows an exploded view of attaching a plurality of latches to the rear bar housing and coupling the front bar housing to the rear bar housing, according to one aspect of the present disclosure.

FIG. 15 shows an example of a spring 14 that is used, according to one aspect of the present disclosure in the peripheral bar assembly 4, as described below in detail. Spring 14 is placed longitudinally within opening 43 (FIG. 6A), as shown in FIG. 19A and described below.

Figure 16A:
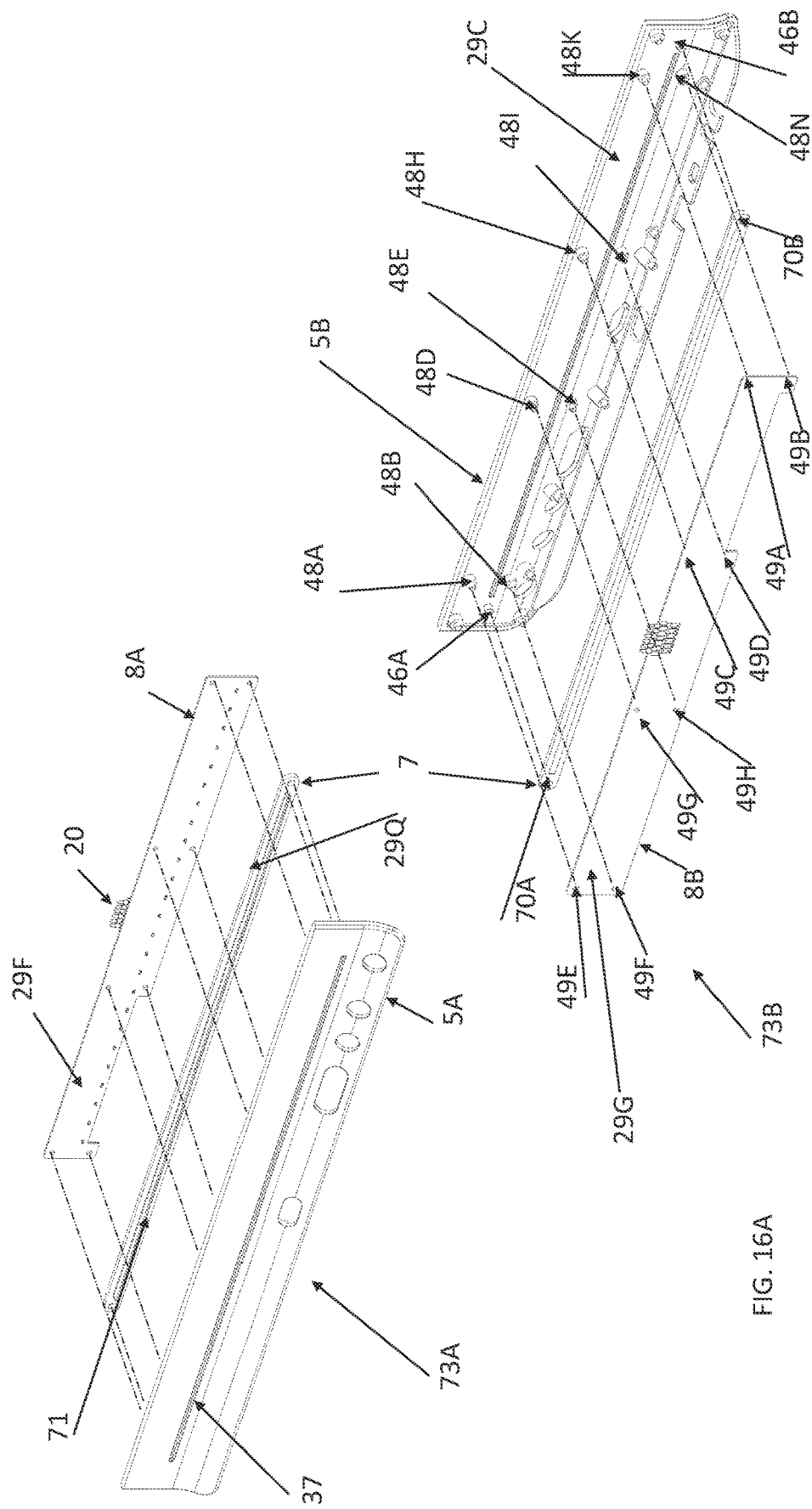
FIG. 16A shows an exploded view of attaching the I/O PCB and the diffuser to the front bar housing, according to one aspect of the present disclosure.

FIG. 16A shows a front exploded view 73A with the front bar housing segment 5A and a rear exploded view 73B with the rear segment 5B for assembling the diffuser 7 and the I/O PCB 8 to the front bar housing 5, according to one aspect of the present disclosure. In one aspect, openings 70A and 70B of the diffuser 7 are aligned with protrusion 46A and 46B of the rear bar housing 6. This aligns the opening 37 of the front bar housing 5 with opening 71 of diffuser 7. Protrusion 48A fits into opening 49E, while protrusion 48B fits into opening 49F. Protrusion 48D fits into opening 49G, while protrusion 48E fits into opening 49H. Protrusion 48H fits into opening 49C, while protrusion 48I fits into opening 49D. Protrusion 48K fits into opening 49A, while protrusion 48N fits into opening 49B. As shown in view 73A, surface 29F is placed against surface 29R (FIG. 14C) of the diffuser 7. Surface 29Q (FIG. 14B) of the diffuser 7 is placed against surface 29C of the rear segment 5B.

Figure 16B:
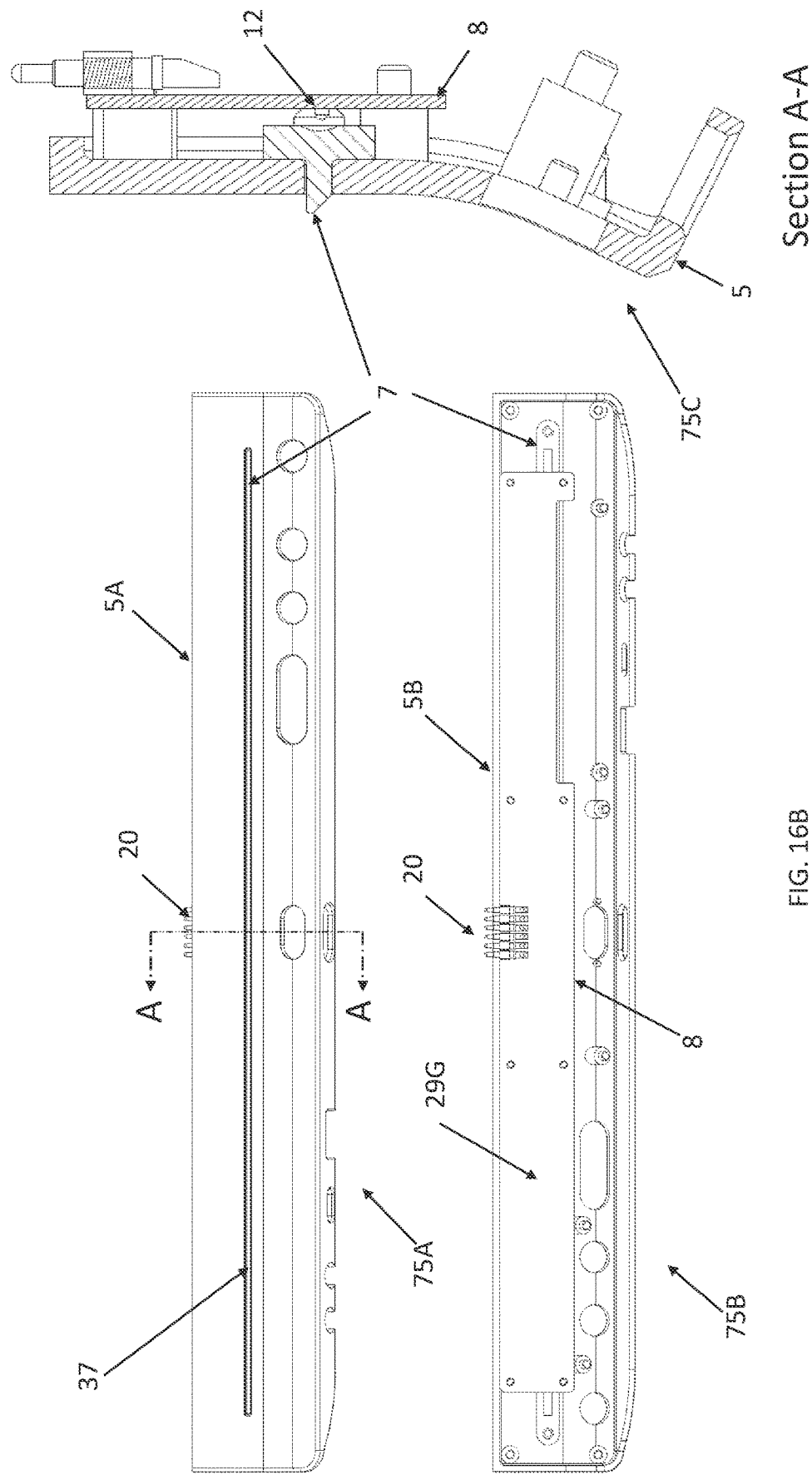
FIG. 16B shows the front bar housing with the I/O PCB and the diffuser, according to one aspect of the present disclosure.

FIG. 16B shows a front view 75A, and a rear view 75B of front housing assembly with the I/O PCB 8, the diffuser 7 and light source 12. A sectional view 75C of section A-A shows the light source 12 and diffuser 7 in slot 37 of the front bar housing 5.

FIG. 17A shows an example of installing the camera lens 16 and the camera slider 17 to the rear segment 5B of the front bar housing 5, according to one aspect of the present disclosure. As an example, the camera lens 16 is connected to the rear front housing segment 5B using prongs 47A and 47B that are inserted in openings 64A and 64B. The camera slider 17 surface 67E (FIG. 13) is placed against surface 29P of the camera lens, while the lens protrusion 65 (FIG. 12) is placed in opening 38 of the rear segment 5B. The camera slider 17 structural element 67D is placed within cavity 33 of the rear segment 5B of the front bar housing 5.

Figure 17B:
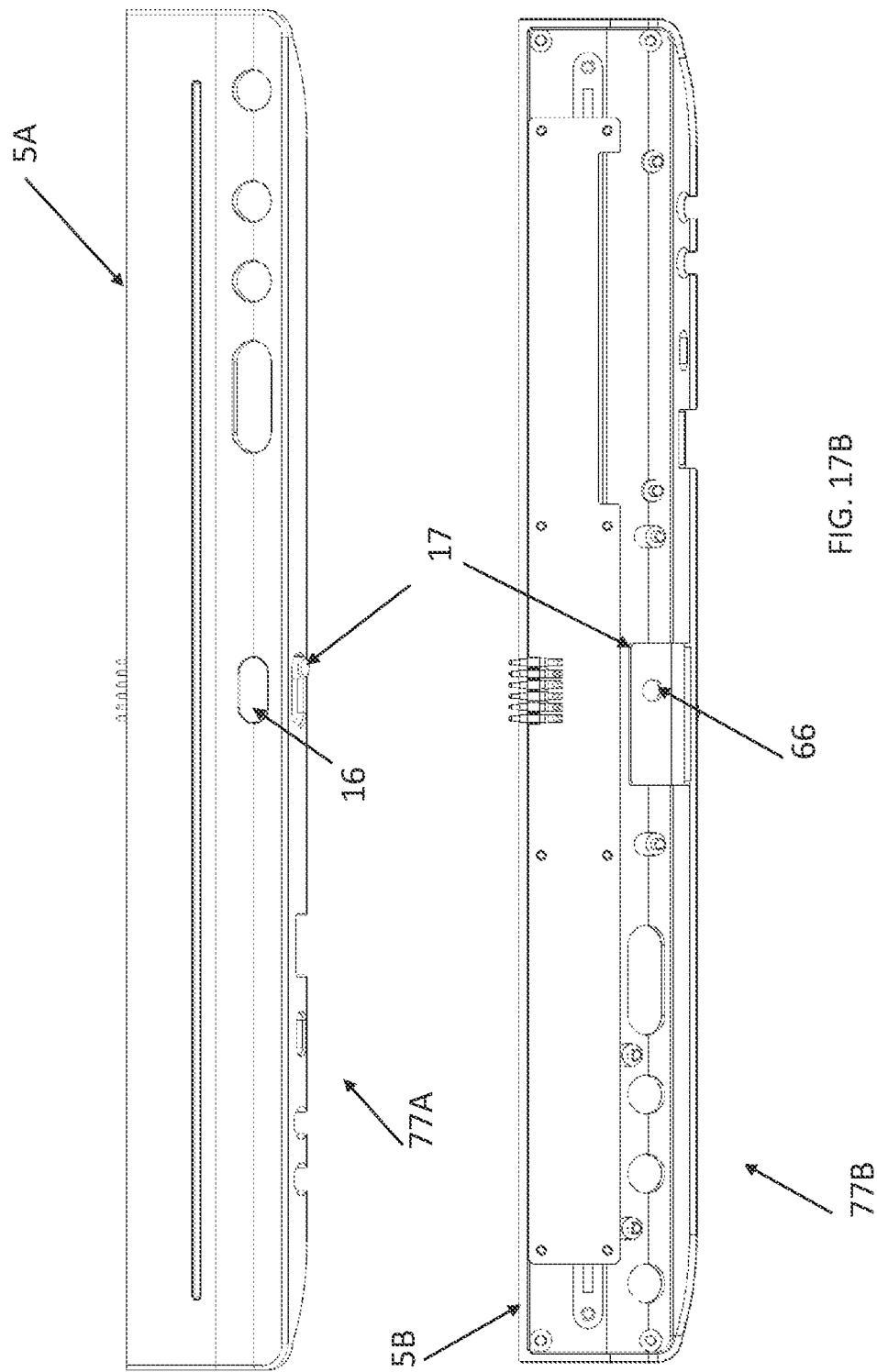
FIG. 17B shows the front bar housing assembly with the attached camera lens and the camera slider, according to one aspect of the present disclosure.

FIG. 17B shows a front view 77A that shows the camera lens 16, and a rear view 77B that shows the camera slider 17 installed using the illustration of FIG. 17A, according to one aspect of the present disclosure. By sliding the camera slider 17 in cavity 33 (FIG. 17B), the opening 66 of the camera slider 17 aligns with the camera lens 16. A user can cover the camera lens 16 by simply sliding the camera slider 17, providing user privacy.

FIG. 18A shows an example of affixing the button PCB 11, PCB 10 and IJU PCB 9 to the rear segment 5B of the front bar housing 5, according to one aspect of the present disclosure. The button PCB 11 is affixed by inserting protruded elements 48G and 48C in openings 56A and 56B, respectively of button PCB 11. The tongue like structure 54 of the button PCB 11 slides into the space between the I/O PCB 8 and the rear segment 5B of the front bar housing 5. Surface 29K of button PCB 11 is placed on surface 29C of the rear segment 5B and the button PCB 11 rests on the horizontal platform 30A of the rear segment 5B.

In one aspect, the PCB 10 is affixed by inserting protruded elements 48F and 48M in openings 60A and 60B, respectively. Surface 62A of the PCB 10 faces the surface 29C of the rear segment 5B. The tongue like structure 63 of the PCB 11 slides into the space between the I/O PCB 8 and the rear segment 5B of the front bar housing 5.

In one aspect, the IJU PCB 9 is affixed by inserting protruded elements 48J and 48L in opening 52B and 52A, respectively. Surface 29H of the PCB 10 faces the surface 29C of the rear segment 5B. The tongue like structure 53 of the PCB 9 slides into the space between the I/O PCB 8 and the rear segment 5B of the front bar housing 5.

Figure 18B:
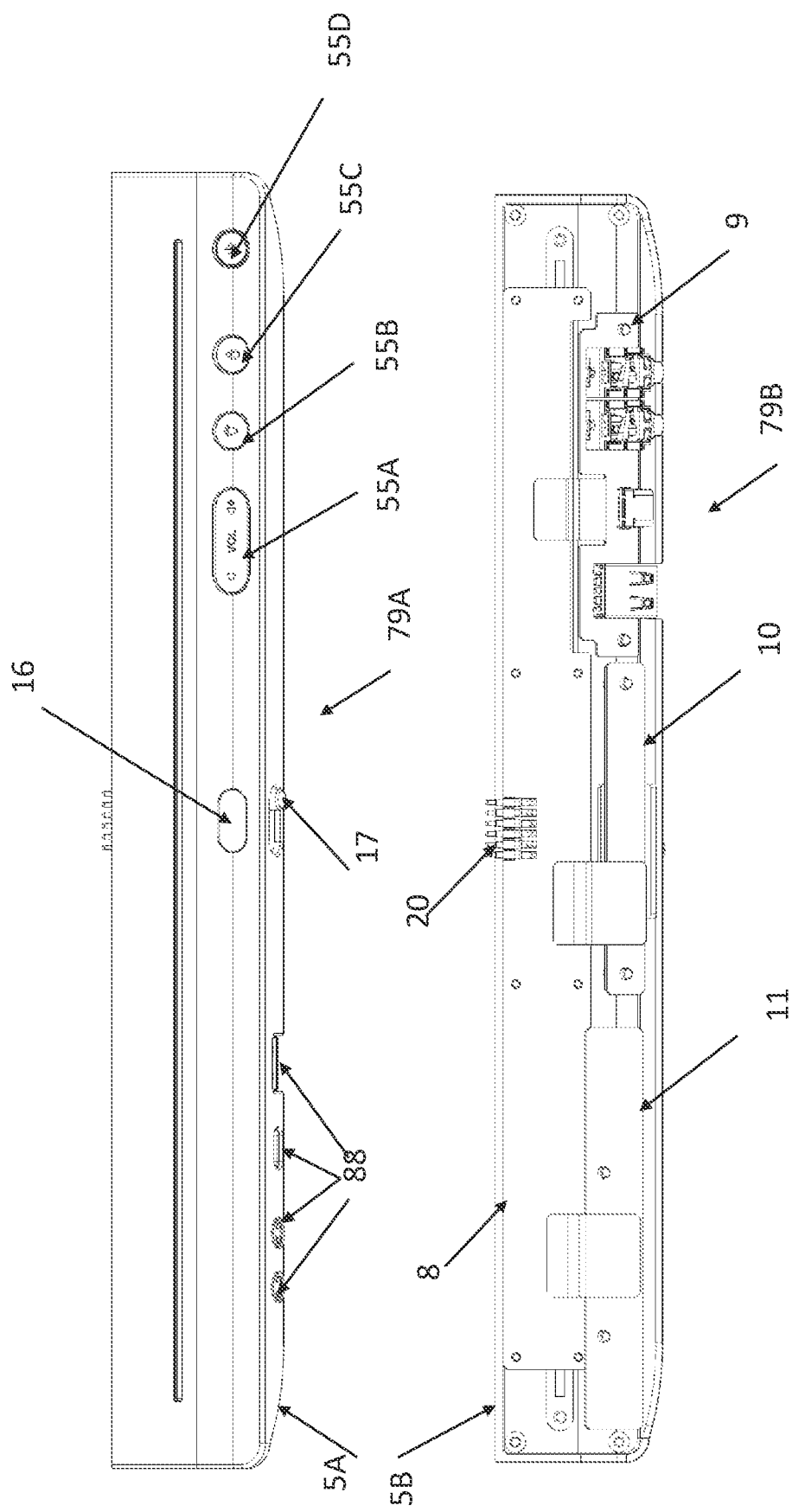
FIG. 18B shows the front bar housing assembly with the attached, plurality of PCBs, according to one aspect of the present disclosure.

FIG. 18B shows a front view 79A and a rear view 79B of the front housing 5 assembly. The front view 79A shows the various jacks 88 that are made available from the IJU PCB 9, the I/O buttons 55A-55D made available from the I/O PCB 11. The rear view 79B shows the I/O PCB 8, IJU PCB 9, the I/O PCB 11 and PCB 10 attached to the rear segment 5B of the front bar housing 5, as described above in detail.

FIG. 19A shows a front isometric view 87A and rear isometric view 18B for attaching the latches 13A/13B to the rear bar housing 6 and then coupling the front bar housing 5 and rear bar housing 6 to create the innovative peripheral bar assembly 4, according to one aspect of the present disclosure. The cylindrical cavity 31D of the front segment 6A of the rear bar housing 6 faces surface 29C of the rear segment 5B of the front bar housing 5. The front view 87A shows a first latch 13A secured by a fastener 80A in cavity 26A of the front segment 6A of the rear bar housing 6. The second latch 13B is secured using fastener 80B in cavity 26B of the front segment 6A of the rear bar housing 6. Cavity 26A includes the spring 14 aligned horizontally along opening 43 (FIG. 6A). Cavity 26B also includes the spring 14 aligned horizontally.

In one aspect, the protruded elements 28A-28D, orthogonal to surface 20C of rear segment 5B are inserted in cavities 27A-27D to seal the front bar housing 5's rear segment with the front segment 6A of the rear bar housing 6.

A front view 81A of the peripheral assembly 4 is shown in FIG. 19B. A sectional view 81B taken in the direction is shown by lines B-B with a cross-section view of the spring 14 and latch 13.

FIG. 19C shows a front view 4A, a top view 4B, an isometric view 4C and the side view 4D of the fully assembled peripheral bar housing 4 using the various assembly processes described above, according to one aspect of the present disclosure.

In one aspect, as described above in detail, innovative peripheral bar assembly 4 is provided. The peripheral bar assembly 4 can be fully enclosed or partially enclosed with a front bar housing 5 and rear bar housing 6, which contains accessory hardware that is independent and separate from the main chassis 2 and the display module 3. The peripheral bar assembly 4 can be affixed to the main chassis 2 using fasteners or a latching mechanism 13, which allows it to be removed and replaced or easily upgraded. The peripheral bar assembly 4 includes an electrical connector 20 which interfaces with a mating connector 21 on the main chassis 2. This enables power, ground and electrical signals to pass between the display module 3 and the peripheral bar assembly 4.

As described above in detail, different accessory hardware can be included within the peripheral bar assembly 4, for example, without limitation, I/O buttons (either mechanical or capacitive), jacks (USB, 3.5 mm audio jack, etc.), antennas (Wi-Fi, and others) and sensors (e.g., cameras, ambient light sensors, proximity sensors and others), and accent lights. In one aspect, the accessory hardware components within the peripheral bar assembly 4 may be constructed as individual, replaceable modules i.e. as sub-modules, e.g., a USB or audio jack can be replaced easily without having to discard the entire peripheral bar assembly 4.

In one aspect, by moving features and sensors to the peripheral bar assembly 4, rather than embedding them within the main chassis, as configured by conventional systems, an IFE system provider can easily and cost-effectively, support different feature configurations with minimal re-design and certification effort. This allows airlines to customize the display systems per their needs, e.g., if an airline does not want a camera on the display system, the modular design of the peripheral bar assembly 4 can be adapted and provided without a camera. The peripheral bar assembly 4 also enables airlines to easily and quickly replace commonly failed hardware items on the aircraft, such as audio and USB jacks. It also enables the airlines to easily upgrade the display systems and implement new and improved features/sensors (e.g., upgraded Bluetooth antennas and protocols, better cameras, new types of jacks, and other hardware features), without having to replace and re-qualify the entire display system.

Figure 20A:
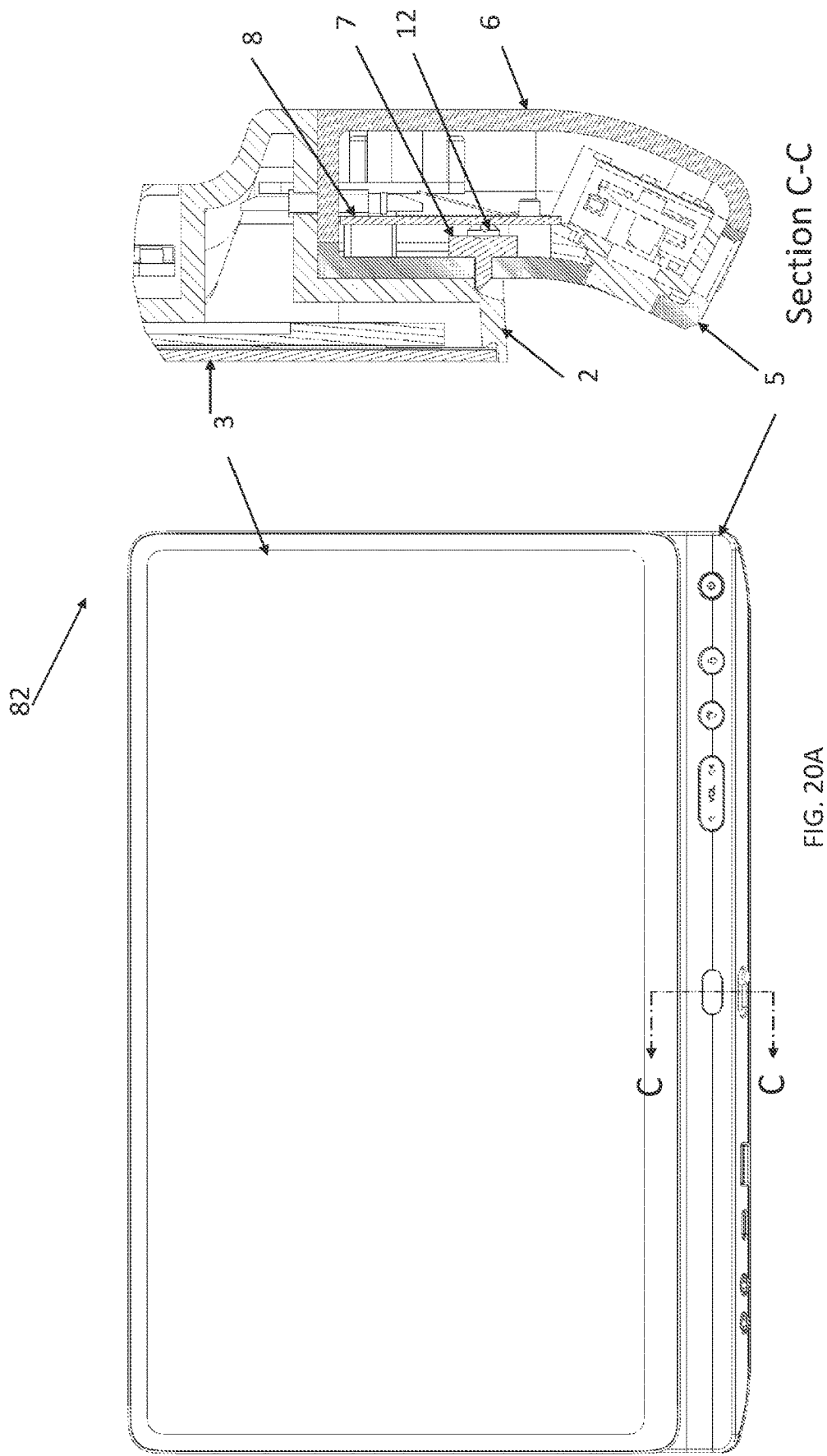
FIG. 20A shows a front view of the display system with the peripheral bar housing and a sectional view showing with an accent light source in the peripheral housing assembly, according to one aspect of the present disclosure.
Figure 21:
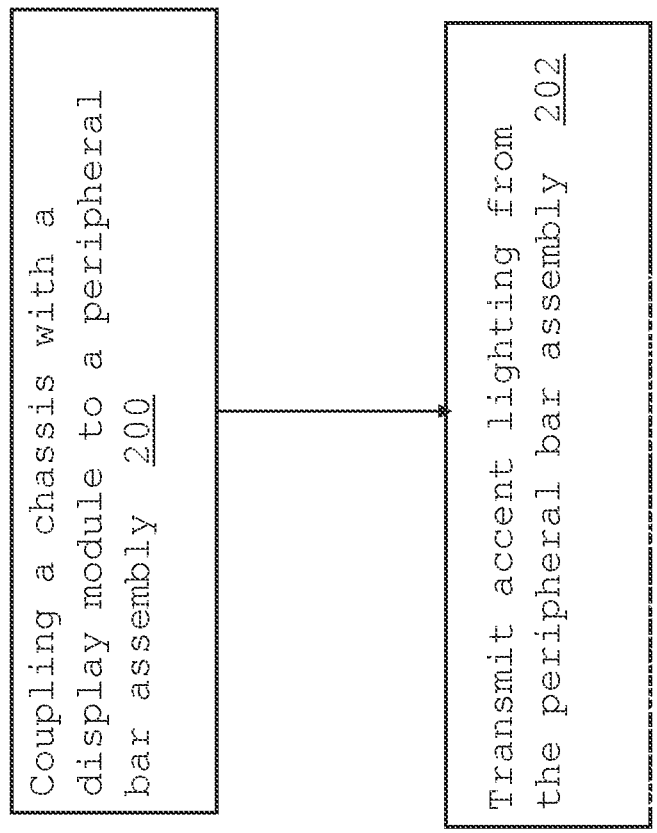
FIG. 21 shows a process, according to one aspect of the present disclosure.

FIG. 20A-20E show various enabling views of placing the light source 12 in various configurations, according to various aspects of the present disclosure. FIG. 20A shows a sectional view 82 for placing the light source 12 in the peripheral housing 4, as shown in FIG. 16A and described above in detail.

FIG. 20B shows an exploded view 84A for placing the light source 12 on LED PCB 15 between the peripheral bar and the main chassis 2. An adhesive layer 18 attaches the LED PCB to the front bar housing 5. A sectional view 84B along lines E-E illustrates the placement of the light source 12. FIG. 20C shows a sectional view 83 along lines D-D of the complete assembly with chassis 2.

FIG. 20D shows an exploded view 86A for attaching the diffuser 7 to the front bar housing 5 using adhesive. In this configuration the light source 12 is placed within the chassis such that the light source is vertically above the diffuser 7. This is shown in the sectional view 86B that is taken across lines G-G. FIG. 20E shows a front view 85A with the light source placed in the main chassis. The light source placement is shown in the sectional view 85B, along lines F-F.

In one aspect, a display system 1 with a display module 3, housed inside the main chassis 2 is provided. A separate, modular peripheral bar assembly 4 configured with the front Bar housing 5 and the rear bar housing 6 with additional electronics interface with the display module 3 to provide peripheral interface via a plurality of PCBs 8, 9, 10, 11 and 12, as described above. The separate peripheral bar assembly 4 makes an electrical connection to the display module 3 through the I/O PCB 8 to provide communication between the peripherals and the display module 3. The I/O PCB 8 may also include an array of LEDs which directs light through the diffuser 7 to provide accent lighting from the bottom edge of the display system 1. As described above, the LED arrangement can vary and may be integrated with the main chassis 2, instead of the LED arrangement and position is not limited to figures shown, rather LED's may be integrated on the main chassis 2 side instead of the Peripheral Bar side.

In one aspect, an innovative peripheral bar assembly 4 (FIG. 19c) having a front bar housing 5 with a front segment 5A (FIG. 5A) and a rear segment 5B (FIG. 5B), the front bar housing having a through slot 37 (FIG. 5A) aligned with a diffuser 7, the diffuser 7 operationally coupled (FIG. 16A) to a first surface 29F (FIG. 16A) of an I/O PCB 7 (FIG. 16A), the first surface 29F having a plurality of light sources 12 (FIG. 14A), each light source emitting light that is transmitted through the diffuser 7 and the slot 37, the I/O PCB 8 having a second surface 29G (FIG. 16A) opposite to the first surface, the second surface placed on the rear segment of the front bar housing; and a rear bar housing 6 having a front segment 6A (FIG. 6A) and a rear segment 6B (FIG. 6B), the front segment of the rear bar housing coupled (FIG. 19A) to the rear segment of the front bar housing. A top surface 31A of the peripheral bar assembly 4 is coupled to a bottom 32A (FIG. 3) of a chassis 2 (FIG. 3) of a display system 1 (FIG. 3) of a transportation vehicle having a display module 3 (FIG. 3) located within the chassis 3. The peripheral bar assembly 4 provides accent lighting through the slot of the front bar housing.

In another aspect, the plurality of light sources 12 is located (FIG. 20B) between the peripheral bar assembly 4 and the chassis 2. In yet another aspect, the plurality of light sources 12 is in the chassis 2 (FIG. 20E).

Figure 22:
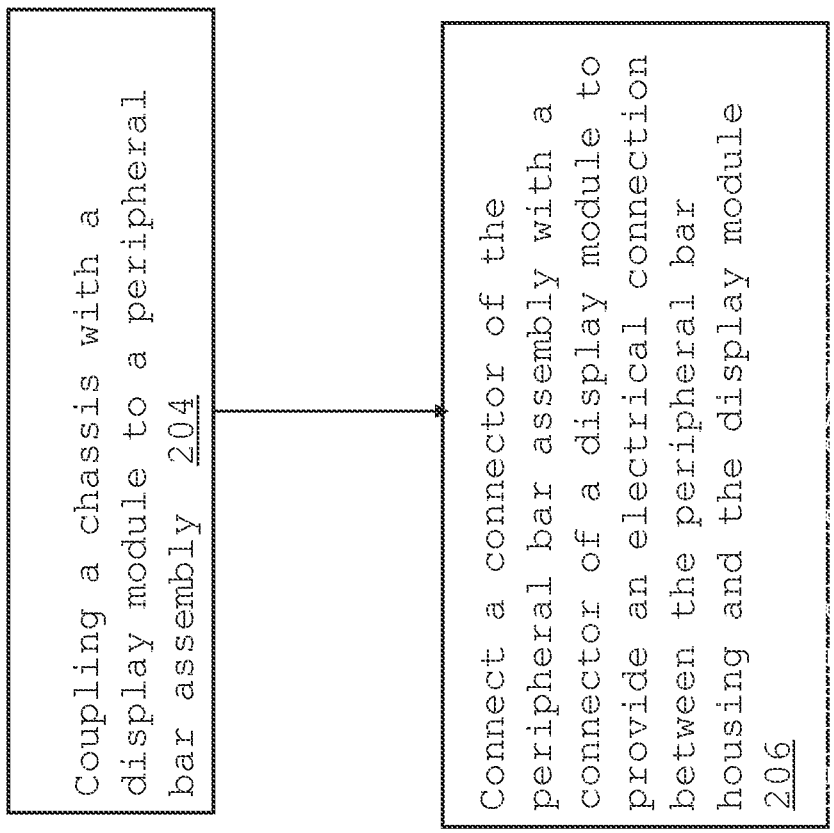
FIG. 22 shows another process, according to one aspect of the present disclosure.

In another aspect, a method is provided, as shown in FIG. 22. In block 200, the method describes coupling a chassis 2 with a display module 3 of a transportation vehicle to a peripheral bar assembly 4 having a rear bar housing 6 with a front segment 6A and a rear segment 6B, and a front bar housing 5 having a front segment 5A and a rear segment 5B, the front bar housing 5 having a through slot 37 aligned with a diffuser 7, the diffuser operationally coupled to a first surface 29F of an I/O PCB 8, the first surface having a plurality of light sources 12, and the front segment 6A of the rear bar housing 6 coupled to the rear segment 5B of the front bar housing. In block 202, the process discloses transmitting light through the diffuser 7 and the slot 37 to provide accent lighting through the slot of the front bar housing.

In one aspect, innovative technology with a peripheral bar assembly 4 (FIG. 1/FIG. 19C) for a transportation vehicle is provided. The peripheral bar assembly 4 includes a front bar housing 5 with a front segment 5A (FIG. 5A) and a rear segment 5B (FIG. 5B); a rear bar housing 6 with a front segment 6A (FIG. 6A) and a rear segment 6B (FIG. 6B). The front segment 6A of the rear bar housing 6 is coupled to the rear segment 5B of the front bar housing (FIG. 19A). The peripheral bar assembly includes an I/O PCB 8 (FIG. 7A) having an I/O connector 20, the I/O PCB coupled (FIG. 16A) to the rear segment 5B of the front bar housing. A top surface (31A, FIG. 3) of the peripheral bar assembly 4 is coupled to a bottom surface (32A, FIG. 3) of a chassis 2 (FIGS. 1 and 3) of a display system (FIGS. 1, 2 and 3) of the transportation vehicle having a display module 3 (FIGS. 1 and 3) located within the chassis 2. The I/O connector 20 is coupled to a connector 21 (FIG. 3) of the display module for enabling an electrical connection between the peripheral bar assembly 4 and the display module 3.

In another aspect, the peripheral bar assembly 4 further includes a button PCB 11 (FIG. 9A) coupled (FIG. 18A) to the rear segment 5B of the front bar housing. The button PCB including a plurality of buttons (e.g., 55A-55D, FIG. 9A) for receiving user input to access one or more functions from the display system 1.

In yet another aspect, the peripheral bar assembly 4 further includes a PCB 9 (FIG. 8A/8B) coupled (FIG. 18A) to the rear segment 5B of the front bar housing to provide a plurality of jacks 88 (FIG. 18B) from the display system 1. The peripheral bar assembly 4 further includes a PCB 10 (FIG. 11A) coupled (FIG. 18A) to the rear segment 5B of the front bar housing to provide a digital camera 16 (FIG. 11A) for the display system 1. The peripheral bar assembly 4 further includes a first latch 13A (FIG. 19A) and a second latch 13B (FIG. 19A) coupled to the front segment 6A of the rear bar housing 6. The first latch 13A is placed in a first cavity 23A (FIG. 3) on the bottom surface 32A of the chassis 2 and the second latch 13B is placed in a second cavity 23B (FIG. 3) on the bottom surface 32A of the chassis 2 to couple the peripheral housing assembly with the chassis.

In another aspect, a method as shown in is provided. In block 204, the method includes coupling (FIG. 3) a bottom surface 32A of a chassis 2 with a display module 3 of a display system 1 of a transportation vehicle to a top surface of a peripheral bar assembly having a front bar housing 5 with a front segment 5A and a rear segment 5B, a rear bar housing 6 with a front segment 6A and a rear segment 6B, and an I/o PCB 8 having an I/O connector 20, the front segment 6A of the rear bar housing 6 coupled to the rear segment 5B of the front bar housing 5, and the I/O PCB 8 coupled to the rear segment 5B of the front bar housing. In block 206, the method includes connecting (FIG. 2) the I/O connector 20 to a connector 21 of the display module 3 for enabling an electrical connection between the peripheral bar assembly 4 and the display module 3.

Figure 23:
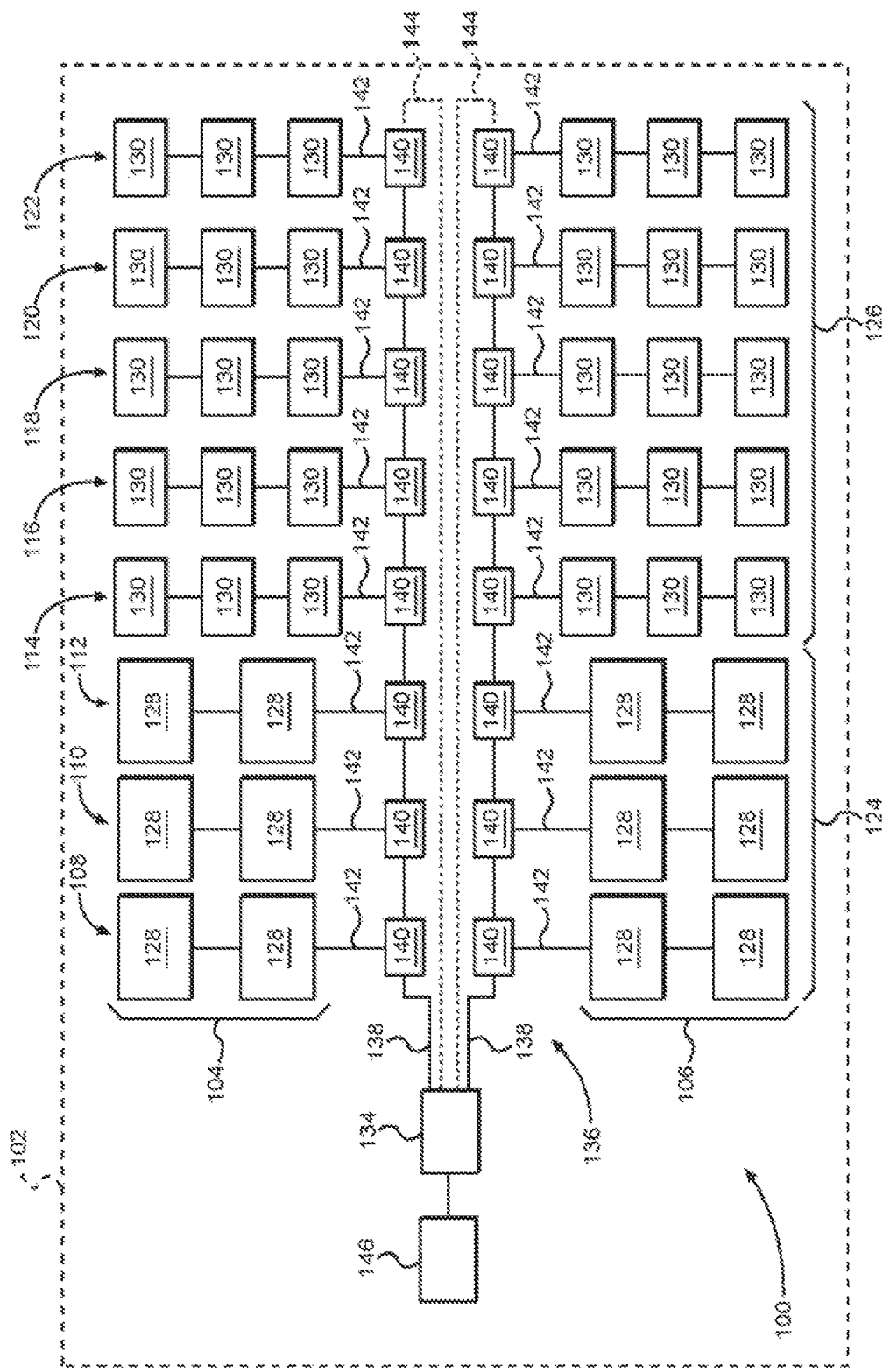
FIG. 23 shows a seating arrangement for using the display system, according to one aspect of the present disclosure.

System 100: FIG. 23 schematically illustrates a vehicle entertainment system 100 disposed in a vehicle 102 using the display system 1 with the innovative peripheral bar assembly 4, described above in detail. The type of vehicle 102 is not limited and may be any kind of vehicle for carrying passengers, for example, an aircraft, bus, train, boat, submarine or spaceship. In this example, the vehicle 102 includes two seat columns 104 and 106 arranged symmetrically from one another across an aisle as typical in vehicles used for passenger transport. Each column 104 and 106 includes seat rows 108 through 122 extending generally orthogonally away from the aisle between the columns. It should be appreciated that FIG. 23 is a schematic drawing for explanatory purposes and passenger transport vehicles, such as aircraft used for commercial passenger transport, which can have hundreds of seats and consequently many more columns and rows than that illustrated in FIG. 23.

The seat rows 108 through 122 may have different number of seats depending on the class of seating of 122 and 124. For example, seat rows 108 through 112 nearer the front of the vehicle 102 may be premium class seating 122, such as business or first class and have larger seats 128 and/or more spacing between the seats 128. Seat rows 114 through 122 further back in the vehicle 102 may be economy class 126 and have smaller seats 130 and/or less spacing between the seats. Often a bulkhead, not shown, separates one class of seating 124 and 126 from another. The peripheral bar assembly 4 described above in detail can be configured with different modular components based on the seating class. For example, for first class, the peripheral bar assembly 4 may have all the features/PCBs described above, while for the economy class, the peripheral bar assembly 4 may not include the camera and other PCBs/jacks.

As an example, the entertainment system for this vehicle includes a plurality of display systems 1, described above. The display system 1 can be mounted to the back of each seat for viewing by a passenger or user in the seat immediately behind the seat to which the display system 1 is mounted. For a seat for which there is no seat forward thereof, the display system 1 is mounted to a bulkhead in front of the seat. Alternatively, such the display system 1 is mounted to a seat arm (not shown) and is retractable into the seat arm when not in use. The adaptive aspects of the present disclosure are not limited to any specific location/position of the display system 1.

As an example, system 100 includes one or more servers 134 for managing overall operations of the entertainment system. The server 134 is of conventional hardware design and commercially available, for example, from Panasonic Avionics Corporation of Lake Forest, California. Servers from other manufactures may be used as well. FIG. 23 illustrates an aspect having a single server 134, but other aspects may have multiple servers 134. The servers 134 preferably use the LINUX operating system but other operating systems could be used as well, such as WINDOWS (without derogation of any third-party trademark rights). The server 134 preferably includes at least one solid-state drive (SSD) (or any other type of storage media) and one or more high performance processors to enable the server to communicate with the display systems 1 and other devices of the transportation vehicle A network 136 connects the display systems 1 and server 134 in communication with another. The network 136 is preferably a conventional local area network (LAN) using Ethernet for communication between the display systems 1 and server 134. The network includes higher speed sub-networks 138 extending from the server 134 along the columns 104 and 106. Preferably, the higher speed sub-networks 138 provide throughput of at least gigabyte Ethernet using conventional 2.5GBase-T, 1000BASE-T, Copper-Gigabit wiring/cabling, or CAT5e. The higher speed sub-networks 138 are referred to hereinafter as column sub-networks 138. The column sub-networks 138 connect to seat boxes 140 that include a switch. A lower speed data sub-network 142 may extend from each seat box 140 and extends along the nearest row of seats thereto (seat rows 108, 110, 112, 114, 116, 118, 120, or 122). The lower speed sub-networks 142 may each provide at least 100 mbits/s of throughput via conventional Fast Ethernet connections using 100BASE-TX wiring. The lower speed sub-networks 142 form seat LANs or seat sub-networks of at least two display systems 1, as opposed to the earlier described column sub-networks 138. The various adaptive aspects described herein are not limited to any particular network protocol or network operating speed.

In one aspect, the seat boxes 140 supply both network connections and power to the display systems 1 connecting thereto. Each seat box 140 includes a processor and memory, in which the processor executes software or program logic. The seat boxes may be of conventional hardware and are frequently referred to in the in-flight entertainment field as Power-Network Boxes (PNBs) as the seat boxes 140 provide both power and network connections. Alternatively, the seat boxes 140 may be referred to as Seat Interface Boxes (SIBs). If larger display modules 3 are used, the seat boxes 140 may provide network connections only, with power provided separately via seat electrical boxes (SEBs) or seat power modules (SPMs). Power Network Boxes, Seat Interface Boxes, Seat Electrical Boxes and Seat Power Modules are all available from Panasonic Avionics Corporation. The term seat box as used herein includes switches that provide both power and network connections for the display system 1 and switches that provide only network connections.

Optionally, the network 138 may include a redundant communication connection or connections 144 for use in the event of a communication path failure. In this regard, a pathway failure along either column sub-network 138 would cut communications between the server 134 and display systems 1 in that column 104 or 106 for seats 128 and 130 downstream of the failure. Therefore, a redundant communication connection 144 may extend between the last seat box 140 in each column 104 and 106 and the server 134. The redundant communication connection 144 provides an alternative communication path in the event of a failure in a column sub-network 138 to prevent the display systems 1 from being cut off from communication with the server 134.

In one aspect, the redundant communication connections 144 provide full communication redundancy and provide gigabyte Ethernet using conventional 2.5GBase-T, 1000BASE-T or Copper-Gigabit wiring/cabling. For cost reduction, the redundant communication connections 144 may be lower data rate connections and reserved only for public announcements and map data from the server 134. In this regard, the entertainment system 100 includes an interface or crew terminal 146 for use by vehicle personnel to control the entertainment system 100 and communicate public announcements to the display systems 1. Redundant communication connections 144 provide for an alternative way to broadcast public announcements to the passengers in the event of a communication failure.

In one aspect, instead of wired connections, display system 1 could wirelessly connect over a network either directly with one another or indirectly via a wireless access point. The communication standard could be according to the 802 family (Wi-Fi), BLUETOOTH standard, or other communication standards. If a wireless access point is provided, it could have local content storage and act as another source of media files should a connectivity failure occur. Streaming could provide different quality of service depending on the source, for example, lower speed connections, such as a wireless connection, providing lower quality of service.

Innovative technology for a vehicular entertainment system has been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A peripheral bar assembly, comprising:
a front bar housing with a front segment and a rear segment;
a rear bar housing with a front segment and a rear segment, the front segment of the rear bar housing coupled to the rear segment of the front bar housing;
an input/output (I/O) printed circuit board ("PCB") having an I/O connector, the I/O PCB coupled to the rear segment of the front bar housing;
wherein a top surface of the peripheral bar assembly is coupled to a bottom surface of a chassis of a display system of a transportation vehicle having a display module located within the chassis, wherein the I/O connector is coupled to a connector of the display module for enabling an electrical connection between the peripheral bar assembly and the display module.

2. The peripheral bar assembly of claim 1, further comprising: a button PCB coupled to the rear segment of the front bar housing, the button PCB including a plurality of buttons for receiving user input to access one or more functions from the display system.

3. The peripheral bar assembly of claim 1, further comprising: a PCB coupled to the rear segment of the front bar housing to provide a plurality of jacks from the display system.

4. The peripheral bar assembly of claim 1, further comprising: a PCB coupled to the rear segment of the front bar housing to provide a digital camera for the display system.

5. The peripheral bar assembly of claim 1, further comprising: a first latch and a second latch coupled to the front segment of the rear bar housing.

6. The peripheral bar assembly of claim 5, wherein the first latch is placed in a first cavity on the bottom surface of the chassis and the second latch is placed in a second cavity on the bottom surface of the chassis to couple the peripheral housing assembly with the chassis.

7. The peripheral bar assembly of claim 1, wherein the transportation vehicle is an aircraft.

8. A display system of a transportation vehicle, comprising:
a chassis with a display module; and
a peripheral bar assembly having a front bar housing with a front segment and a rear segment, a rear bar housing with a front segment and a rear segment, the front segment of the rear bar housing coupled to the rear segment of the front bar housing and an input/output (I/O) printed circuit board ("PCB") having an I/O connector, the I/O PCB coupled to the rear segment of the front bar housing;
wherein a top surface of the peripheral bar assembly is coupled to a bottom surface of the chassis;
wherein the I/O connector is coupled to a connector of the display module for enabling an electrical connection between the peripheral bar assembly and the display module.

9. The system of claim 8, wherein the peripheral bar assembly includes a button PCB coupled to the rear segment of the front bar housing, the button PCB including a plurality of buttons for receiving user input to access one or more functions from the display module.

10. The system of claim 8, wherein the peripheral bar assembly includes a PCB coupled to the rear segment of the front bar housing to provide a plurality of jacks from the display system.

11. The system of claim 8, wherein the peripheral bar assembly includes a PCB coupled to the rear segment of the front bar housing to provide a digital camera for the display system.

12. The system of claim 8, wherein the peripheral bar assembly includes a first latch and a second latch coupled to the front segment of the rear bar housing.

13. The system of claim 12, wherein the first latch is placed in a first cavity on the bottom surface of the chassis and the second latch is placed in a second cavity on the bottom surface of the chassis to couple the peripheral housing assembly with the chassis.

14. The system of claim 8, wherein the transportation vehicle is an aircraft.

15. A method, comprising:
coupling a bottom surface of a chassis having a display module of a display system of a transportation vehicle to a top surface of a peripheral bar assembly that includes a front bar housing with a front segment and a rear segment, a rear bar housing with a front segment and a rear segment, and an input/output (I/O) printed circuit board ("PCB") having an I/O connector, the front segment of the rear bar housing coupled to the rear segment of the front bar housing, and the I/O PCB coupled to the rear segment of the front bar housing; and
connecting the I/O connector to a connector of the display module for enabling an electrical connection between the peripheral bar assembly and the display module.

16. The method of claim 15, wherein the peripheral bar assembly includes a button PCB coupled to the rear segment of the front bar housing, the button PCB including a plurality of buttons for receiving user input to access one or more functions from the display module.

17. The method of claim 15, wherein the peripheral bar assembly includes a PCB coupled to the rear segment of the front bar housing to provide a plurality of jacks from the display system.

18. The method of claim 15, wherein the peripheral bar assembly includes a PCB coupled to the rear segment of the front bar housing to provide a digital camera for the display system.

19. The system of claim 15, wherein the peripheral bar assembly includes a first latch and a second latch coupled to the front segment of the rear bar housing.

20. The system of claim 19, wherein the first latch is placed in a first cavity on the bottom surface of the chassis and the second latch is placed in a second cavity on the bottom surface of the chassis to couple the peripheral housing assembly with the chassis.

\* \* \* \* \*